US012783819B2

(12) United States Patent
Van Sonsbeek et al.

(10) Patent No.: US 12,783,819 B2
(45) Date of Patent: Nov. 3, 2026

(54) CUSTOMIZING INFORMATION USING A LOCAL LANGUAGE MODEL BASED ON A PROFILE

(71) Applicant: Microsoft Technology Licensing, LLC, Redmond, WA (US)

(72) Inventors: Tom Jacobus Van Sonsbeek, Weesp (NL); Ebey Paulose Abraham, Oxford (GB); Alexandros Neofytou, London (GB); Sunando Sengupta, Reading (GB); Eric Chris Wolfgang Sommerlade, Oxford (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 18/611,439

(22) Filed: Mar. 20, 2024

(65) Prior Publication Data

US 2025/0259014 A1 Aug. 14, 2025

Related U.S. Application Data

(60) Provisional application No. 63/553,505, filed on Feb. 14, 2024.

(51) Int. Cl.
*G06F 40/40* (2020.01)
*G06N 3/0455* (2023.01)

(52) U.S. Cl.
CPC ........... *G06F 40/40* (2020.01); *G06N 3/0455* (2023.01)

(58) Field of Classification Search
CPC ....... G06F 40/40; G06N 3/0455; G06N 3/045
See application file for complete search history.

(56) References Cited

U.S. PATENT DOCUMENTS 6,513,006 B2 * 1/2003 Howard ........... H04N 21/42203 704/E15.045
10,121,468 B2 * 11/2018 Bocchieri ............... G06F 40/58
10,380,997 B1 * 8/2019 Ward ...................... G10L 15/16
(Continued)

FOREIGN PATENT DOCUMENTS

KR 20140093352 A * 7/2014 ............ G06Q 50/01

OTHER PUBLICATIONS

KR20140093352 (Year: 2014).*
(Continued)

*Primary Examiner* — Michael N Opsasnick
(74) *Attorney, Agent, or Firm* — Klarquist Sparkman, LLP

(57) ABSTRACT

A technique uses a local language model, implemented by a local computing device, to customize original information based on a profile of a local entity (e.g., a user). A profile-generating system produces the profile by first using plural machine-trained local encoders to convert a set of content items to instances of local encoded information. The profile-generating system then uses a global encoder to convert the plural instances of local encoded information into profile information that expresses the profile. The technique passes a combination of the original information and the profile information to the local language model, optionally with level information that specifies an extent of customization to be applied to the original information. In some implementations, the original information originates from another language model that is larger than the local language model.

15 Claims, 11 Drawing Sheets

(56) References Cited

U.S. PATENT DOCUMENTS

| | | | | |
|---|---|---|---|---|
| 2014/0108003 | A1* | 4/2014 | Phillips | G06F 40/40 704/8 |
| 2015/0379988 | A1* | 12/2015 | Corfield | G10L 15/32 704/255 |
| 2020/0175961 | A1* | 6/2020 | Thomson | G10L 15/06 |
| 2020/0357388 | A1* | 11/2020 | Zhao | G10L 15/16 |
| 2022/0230628 | A1* | 7/2022 | Zhu | G06F 16/90332 |
| 2023/0012164 | A1* | 1/2023 | Maiman | G06Q 30/0629 |
| 2023/0215419 | A1* | 7/2023 | Yun | G10L 13/04 704/258 |
| 2023/0418848 | A1* | 12/2023 | Clinchant | G06F 40/40 |

OTHER PUBLICATIONS

Ao, et al., "PENS: A Dataset and Generic Framework for Personalized News Headline Generation," in Proceedings of the 59th Annual Meeting of the Association for Computational Linguistics and the 11th International Joint Conference on Natural Language Processing, vol. 1: Long Papers, Aug. 2021, pp. 82-92.

Badr, et al. "OPT-R: Exploring the Role of Explanations in Finetuning and Prompting for Reasoning Skills of Large Language Models," arXiv, arXiv:2305.12001v2 [cs.CL], Oct. 24, 2023, 11 pages.

Qin, et al., "Enabling On-Device Large Language Model Personalization with Self-Supervised Data Selection and Synthesis," arXiv, arXiv:2311.12275v4 [cs.CL], Apr. 16, 2024, 6 pages.

Dong, et al., "Towards Next-Generation Intelligent Assistants Leveraging LLM Techniques," in KDD '23: Proceedings of the 29th ACM SIGKDD Conference on Knowledge Discovery and Data Mining. Aug. 2023, pp. 5792-5793.

Hu, eta 1., "LoRA: Low-Rank Adaptation of Large Language Models," arXiv, arXiv:2106.09685v2 [cs.CL] , Oct. 16, 2021, 26 pages.

Hu, Guangneng, "Personalized Neural Embeddings for Collaborative Filtering with Text," in Proceedings of the 2019 Conference of the North American Chapter of the Association for Computational Linguistics: Human Language Technologies, vol. 1 (Long and Short Papers), Jun. 2019, pp. 2082-2088.

Jaech, et al., "Personalized Language Model for Query Auto-Completion," in Proceedings of the 56th Annual Meeting of the Association for Computational Linguistics (vol. 2: Short Papers), 2019, pp. 700-705.

Jin, et al., "Deep Learning for Text Style Transfer: A Survey," in Computational Linguistics, 48(1), 2022, pp. 155-205.

Kaplan, et al., "Scaling Laws for Neural Language Models," arXiv:2001.08361v1 [cs.LG], Jan. 23, 2020, 30 pages.

King, et al., "Evaluating Approaches to Personalizing Language Models," in Proceedings of the Twelfth Language Resources and Evaluation Conference, 2020, pp. 2461-2469.

Konstan, et al., "Human-Centered Recommender Systems: Origins, Advances, Challenges, and Opportunities," in AI Magazine, 42(3), 2021, pp. 31-42.

Lester, et al., "The Power of Scale for Parameter-Efficient Prompt Tuning," in Proceedings of the 2021 Conference on Empirical Methods in Natural Language Processing, Nov. 2021, pp. 3045-3059.

Li, et al., "GPT4Rec: A Generative Framework for Personalized Recommendation and User Interests Interpretation," arXiv, arXiv:2304.03879v1 [cs.IR], Apr. 8, 2023, 5 pages.

Liang, et al., "Personalized Content Recommendation and User Satisfaction: Theoretical Synthesis and Empirical Findings," in Journal of Management Information Systems, 23(3), 2006, pp. 45-70.

Lin, et al., "StyleBERT: Text-audio sentiment analysis with Bi-directional Style Enhancement," in Information Systems, vol. 114, Article 102147, Mar. 2023, Science Direct summary page only, available at https://www.sciencedirect.com/science/article/abs/pii/S0306437922001259, accessed on Mar. 20, 2024, 6 pages.

Luccioni, et al., "Estimating the Carbon Footprint of BLOOM, a 176B Parameter Language Model," in Journal of Machine Learning Research, 24(253), Mar. 2023, 15 pages.

"Introducing ChatGPT," available at https://openai.com/blog/chatgpt, OpenAI Blog, OpenAI, San Francisco CA, Nov. 30, 2022, 11 pages.

Achiam, et al., "GPT-4 Technical Report," arXiv, arXiv:2303.08774v4 [cs.CL], Dec. 19, 2023, 100 pages.

Qin, et al., "Enabling On-Device Large Language Model Personalization with Self-Supervised Data Selection and Synthesis" arXiv, arXiv:2311.12275v3 [cs. CL], Jun. 14, 2024, 7 pages.

"LLM Large Language Model Cost Analysis," available at https://lajavaness.medium.com/llm-large-language-model-cost-analysis-d5022bb43e9e, Medium, La Javaness R&D, Sep. 28, 2023, 16 pages.

Rao, et al., "Dear Sir or Madam, May I introduce the GYAFC Dataset: Corpus, Benchmarks and Metrics for Formality Style Transfer," arXiv, arXiv:1803.06535v2 [cs.CL], Apr. 16, 2018, 15 pages.

Reif, et al., "A Recipe For Arbitrary Text Style Transfer with Large Language Models," in arXiv, arXiv:2109.03910v4 [cs.CL], Mar. 31, 2022,12 pages.

Rillig, et al., "Risks and Benefits of Large Language Models for the Environment," in Environmental Science & Technology, 57(9), Feb. 2023, pp. 3464-3466.

Salemi, et al., "LaMP: When Large Language Models Meet Personalization," arXiv arXiv:2304.11406v3 [cs.CL], Jan. 9, 2024, 22 pages.

Soni, et al., "Human Language Modeling," in Findings of the Association for Computational Linguistics: ACL 2022, May 2022, pp. 622-636.

Sun, Zhongxiang, "A Short Survey of Viewing Large Language Models in Legal Aspect," arXiv, arXiv:2303.09136v1 [cs.CL], Mar. 16, 2023, 8 pages.

Suzgun, et al., "Prompt-and-Rerank: A Method for Zero-Shot and Few-Shot Arbitrary Textual Style Transfer with Small Language Models." arXiv, arXiv:2205.11503v1 [cs.CL], May 23, 2022, 26 pages.

Touvron, et al., "Llama 2: Open Foundation and Fine-Tuned Chat Models," arXiv, arXiv:2307.09288v2 [cs.CL], Jul. 19, 2023, 23 pages.

Vaswani, et al., "Attention Is All You Need," in 31st Conference on Neural Information Processing Systems (NIPS 2017), 2017, 11 pages.

Vincent, et al., "Personalised Language Modelling of Screen Characters Using Rich Metadata Annotations," arXiv, arXiv:2303.16618v2 [cs.CL], Aug. 11, 2023, 12 pages.

Welch, et al., "Leveraging Similar Users for Personalized Language Modeling with Limited Data," in Proceedings of the 60th Annual Meeting of the Association for Computational Linguistics, vol. 1: Long Papers), May 2022, pp. 1742-1752.

Xu, et al., "LLMCad: Fast and Scalable On-device Large Language Model Inference," arXiv arXiv:2309.04255v1 [cs. NI], Sep. 8, 2023, 15 pages.

Xu, Jinghua, "Xu at SemEval-2022 Task 4: Pre-BERT Neural Network Methods vs Post-BERT ROBERTa Approach for Patronizing and Condescending Language Detection," in Proceedings of the 16th International Workshop on Semantic Evaluation (SemEval-2022), Jul. 2022, pp. 479-484.

Zhang, et al., "Learning Sentiment Memories for Sentiment Modification without Parallel Data," arXiv, arXiv:1808.07311v1 [cs.CL], Aug. 22, 2018, 6 pages.

Touvron, et al., "LLaMA:Open and Efficient Foundation Language Models," arXiv, arXiv:2302.13971v1 [cs.CL], Feb. 27, 2023, 27 pages.

Latif, et al., "Transformers in Speech Processing: A Survey," arXiv:2303.11607v1 [cs.CL], Mar. 21, 2023, 27 pages.

Dosovitskiy, et al., "An Image is Worth 16×16 Words: Transformers for Image Recognition at Scale," arXiv, arXiv:2010.11929v2 [cs. CV], Jun. 3, 2021, 22 pages.

Scao, et al., "BLOOM: A 176B-Parameter Open-Access Multilingual Language Model," arXiv, arXiv:2211.05100v2 [cs.CL], Dec. 11, 2022, 62 pages.

(56) References Cited

OTHER PUBLICATIONS

Radford, et al., "Improving Language Understanding by Generative Pre-Training," available at https://cdn.openai.com/research-covers/language-unsupervised/language_understanding_paper.pdf, OpenAI, San Francisco, California, Jun. 11, 2018, 12 pages.
Extended European Search Report, in European Patent Application No. 25157241.8, mailed on Jul. 3, 2025, 31 pages.

* cited by examiner

T: Tokenizing Component
P: Prompt-Generating Component
C: Info-Combining Component

| | | Big Generic Model | | | | | |
|---|---|---|---|---|---|---|---|
| | | Simple | | Moderate | | Intricate | |
| Local Model | Size | Rouge-1 | PRP | Rouge-1 | PRP | Rouge-1 | PRP |
| Small | 117M | 0.781 | 12 | 0.468 | 12 | 0.344 | 15 |
| Medium | 500M | 0.749 | 14 | 0.480 | 22 | 0.356 | 20 |
| Large | 774M | 0.779 | 26 | 0.490 | 25 | 0.313 | 25 |

| | | Smaller Generic Model | | | | | |
|---|---|---|---|---|---|---|---|
| | | Simple | | Moderate | | Intricate | |
| Local Model | Size | Rouge-1 | PRP | Rouge-1 | PRP | Rouge-1 | PRP |
| Small | 117M | 0.612 | 20 | 0.445 | 21 | 0.216 | 23 |
| Medium | 500M | 0.626 | 24 | 0.416 | 26 | 0.170 | 28 |
| Large | 774M | 0.633 | 24 | 0.417 | 29 | 0.206 | 35 |

FIG. 11

EFFECTS OF USER INFORMATION

| Profile Variations | Rouge-1 | PRP |
|---|---|---|
| Random Noise Replaces Profile | 0.551 | 17 |
| No Profile | 0.552 | 14 |
| Random Profile Used | 0.603 | 18 |
| Regular | 0.781 | 12 |

FIG. 12

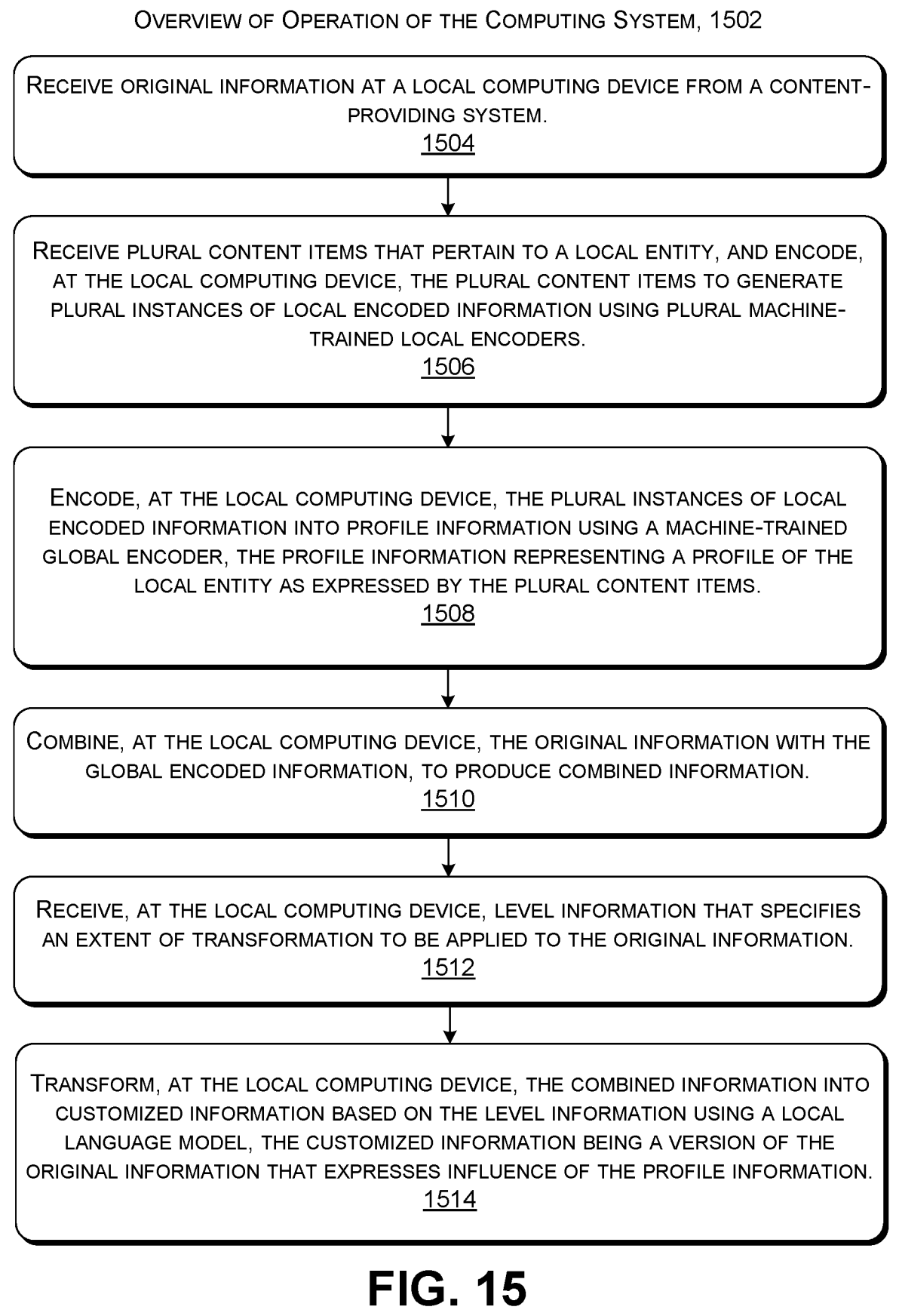

OVERVIEW OF OPERATION OF THE COMPUTING SYSTEM, 1502

RECEIVE ORIGINAL INFORMATION AT A LOCAL COMPUTING DEVICE FROM A CONTENT-PROVIDING SYSTEM.
1504

↓

RECEIVE PLURAL CONTENT ITEMS THAT PERTAIN TO A LOCAL ENTITY, AND ENCODE, AT THE LOCAL COMPUTING DEVICE, THE PLURAL CONTENT ITEMS TO GENERATE PLURAL INSTANCES OF LOCAL ENCODED INFORMATION USING PLURAL MACHINE-TRAINED LOCAL ENCODERS.
1506

↓

ENCODE, AT THE LOCAL COMPUTING DEVICE, THE PLURAL INSTANCES OF LOCAL ENCODED INFORMATION INTO PROFILE INFORMATION USING A MACHINE-TRAINED GLOBAL ENCODER, THE PROFILE INFORMATION REPRESENTING A PROFILE OF THE LOCAL ENTITY AS EXPRESSED BY THE PLURAL CONTENT ITEMS.
1508

↓

COMBINE, AT THE LOCAL COMPUTING DEVICE, THE ORIGINAL INFORMATION WITH THE GLOBAL ENCODED INFORMATION, TO PRODUCE COMBINED INFORMATION.
1510

↓

RECEIVE, AT THE LOCAL COMPUTING DEVICE, LEVEL INFORMATION THAT SPECIFIES AN EXTENT OF TRANSFORMATION TO BE APPLIED TO THE ORIGINAL INFORMATION.
1512

↓

TRANSFORM, AT THE LOCAL COMPUTING DEVICE, THE COMBINED INFORMATION INTO CUSTOMIZED INFORMATION BASED ON THE LEVEL INFORMATION USING A LOCAL LANGUAGE MODEL, THE CUSTOMIZED INFORMATION BEING A VERSION OF THE ORIGINAL INFORMATION THAT EXPRESSES INFLUENCE OF THE PROFILE INFORMATION.
1514

FIG. 15

CUSTOMIZING INFORMATION USING A LOCAL LANGUAGE MODEL BASED ON A PROFILE

This application claims the benefit of U.S. Provisional Application No. 63/553,505 (the '505 Application), filed on Feb. 14, 2024. The '505 Application is incorporated by reference herein in its entirety

BACKGROUND

Providers have sought to increase the accuracy and versatility of language models by increasing the sizes of these models. Currently, for instance, some large language models use hundreds of billions of machine-trained parameters. Providers typically implement these kinds of large language models using server systems. End users use local computing devices to interact with these kinds of language models via a network connection. Each local computing device typically does not have enough memory and processing resources to locally implement these kinds of language models.

Interaction with network-accessible language models is not an ideal solution in all cases. For instance, the server systems that host these models may not always be available. Further, users may be reluctant to share personal information with network-accessible systems, even if the information exchanged with the systems is encrypted. This is a significant drawback, as many language models rely on content that a user considers sensitive for different reasons.

SUMMARY

A technique is described herein for using a local language model, implemented by a local computing device, to customize original information so that the original information conforms to a profile of a local entity. A profile-generating system produces the profile information based on a set of content items, which collectively expresses the profile of the local entity.

In some implementations, the local entity is an individual user who interacts with the local computing device. Here, customization constitutes personalization. In some cases, the personalization by the local language model adopts stylistic themes favored by the user and/or other expression-related preferences of the user that are exhibited in the content items, without changing the message conveyed by the original information.

In some implementations, the content items are text-bearing items that have some relation to the local entity. The text-bearing items include messages, articles, slide presentations, blog posts, product reviews, etc. The text-bearing items are affiliated with the local entity by virtue of the local entity authoring them, commenting on them, liking them, bookmarking them, etc.

In some implementations, the profile-generating system uses plural machine-trained local encoders to convert the content items to instances of local encoded information. The profile-generating system then uses a global encoder to convert the plural instances of local encoded information into soft (abstract) token information, which constitutes the profile information. In some implementations, each encoder uses an attention-based neural network, such as a transformer neural network.

In some implementations, the profile-generating system compresses the text-based information provided by the content items into a relatively small-sized vector or combination of two or more vectors, which serves as the profile information. The local language model is capable of processing the profile information because it does not exceed the local language model's limitations on prompt size.

In some implementations, the technique combines the profile information with the other information (that has yet to be customized) to produce combined information, and then sends the combined information to the local language model.

In some implementations, the original information that is customized originates from a content-providing system. In some implementations, the content-providing system is another language model that is accessible to plural local computing devices associated with plural respective profiles. The other language model uses a first set of machine-trained parameters (e.g., several billion) and the local language model uses a second set of machine-trained parameters that is considerably less than the first set of machine-trained parameters, e.g., at least ten times less. In other implementations, the content-providing system is another type of machine-trained model (besides a language model), a retrieval engine, an editing tool, etc.

In some implementations, the technique includes receiving level information that specifies an extent of transformation to be applied to the original information. The local language model performs customization based on the level information.

The technique is technically advantageous because the local language model makes relatively efficient use of memory and processing resources (compared, for instance, to a large multi-billion-parameter language model running on a server system). This characteristic enables the local language model to run on a local computing device, which typically has limited resources. This characteristic also reduces the carbon cost associated with running the local language model. The low resource demands of the local language model also enable it to be fine-tuned by the local computing device 104 itself. The technique also provides a way to perform customization that does not involve transferring sensitive information to a server system. Further, the technique provides a way of compressing a large amount of text-bearing content into profile information that the local language model is capable of processing (because it does not exceed the prompt size limits imposed by the local language model).

The above-summarized technology is capable of being manifested in different types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF DRAWINGS

FIG. 11 shows the performance of the computing system of FIG. 2 for different sizes of the local language model and for different sizes of the global language model.

FIG. 12 shows the performance of the computing system of FIG. 2 for different versions of the profile information.

FIG. 15 is a flowchart that provides an overview of one manner of operation of the computing system of FIG. 1.

The same numbers are used throughout the disclosure and figures to refer to like components and features.

DETAILED DESCRIPTION

Figure 1:
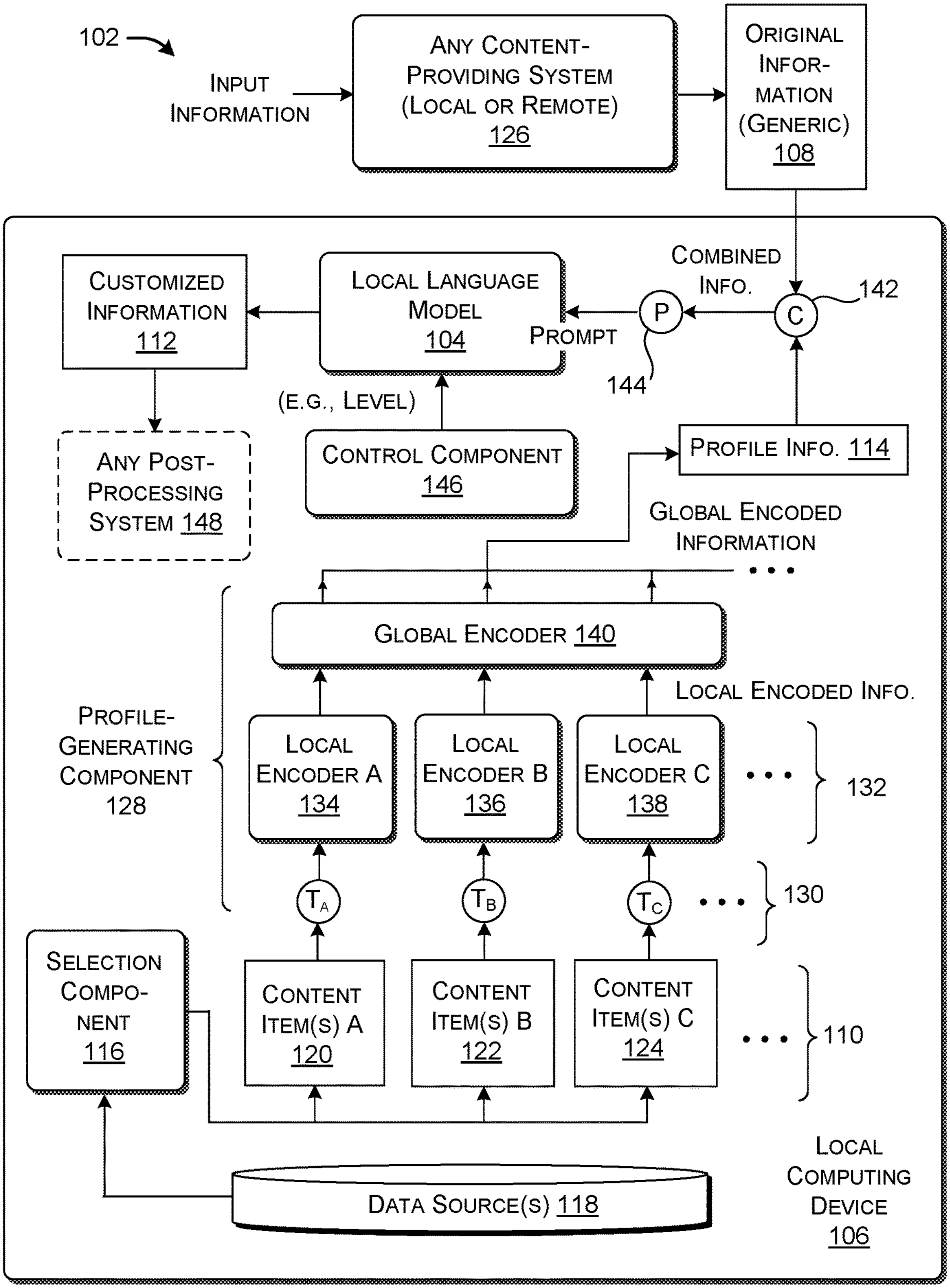
FIG. 1 shows a computing system for implementing a local language model in a local computing device. The local language model customizes original information based on a profile exhibited in a set of content items (and expressed as profile information), to produce customized information.

FIG. 1 shows a computing system 102 for implementing a local language 104 model in a local computing device 106. The local language model customizes original information 108 based on a profile exhibited in a set of content items 110, to produce customized information 112. Profile information 114 expresses the profile. Generally, the qualifier "original" in "original information" refers to a state of information before it has been modified. Customization generally means adaptation based on a specified objective.

Figure 16:
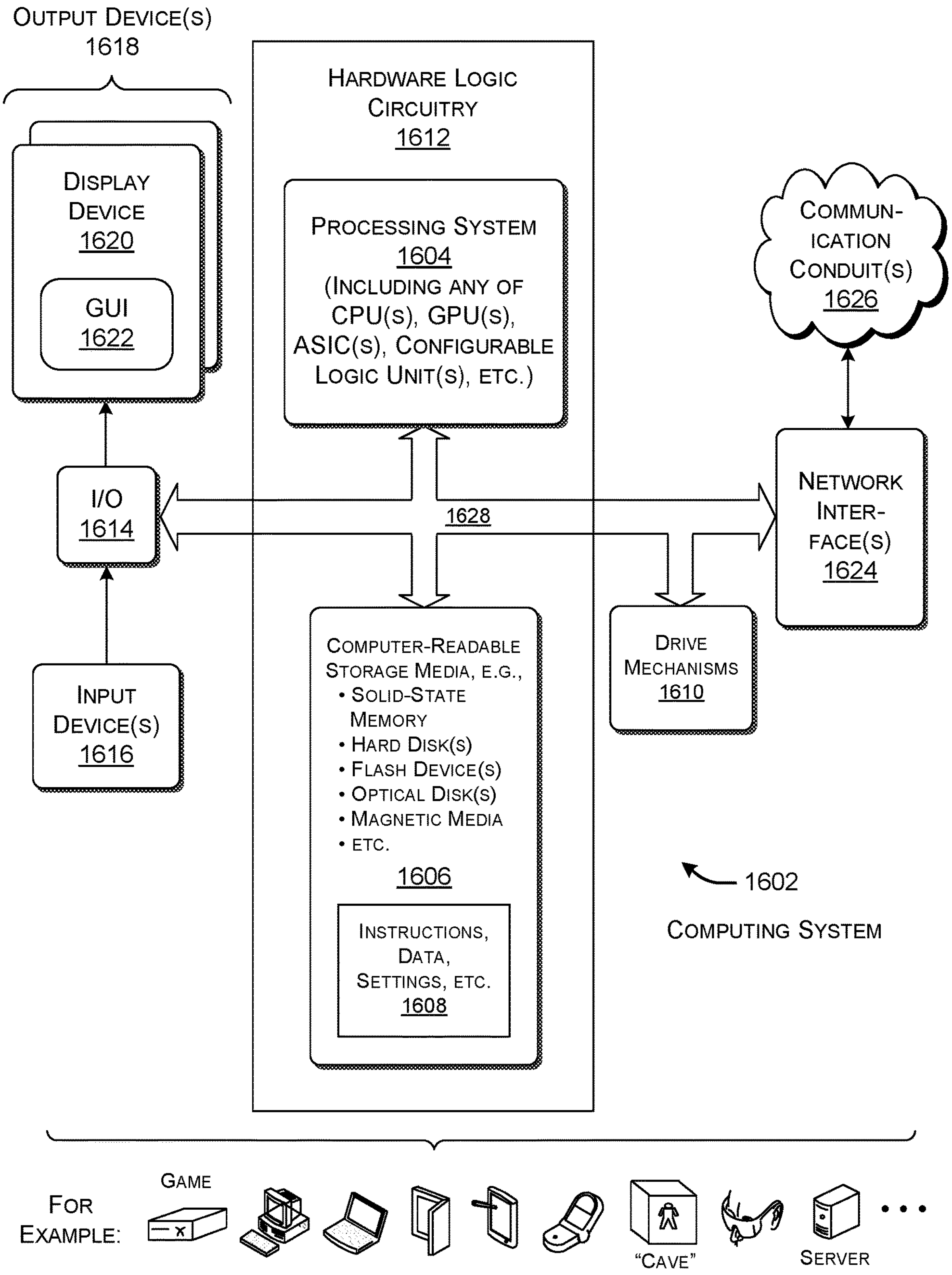
FIG. 16 shows an illustrative type of computing system that, in some implementations, is used to implement any aspect of the features shown in the foregoing drawings.

The computing system 102 will be described below in greater detail in generally a top-down manner. The following terminology is relevant to some examples presented below. A "machine-trained model" or "model" refers to computer-implemented logic for executing a task using machine-trained parameters (e.g., weights, biases, etc.). A "token" refers to a unit of information processed by a machine-trained model, such as a word or a part of a word. In some cases, a tokenizer produces the tokens, but an item (e.g., a text passage) is said to be composed of tokens in a general sense (in which "token" is a synonym of "part"), irrespective of when and where those tokens are actually produced. A "prompt" refers to a sequence of tokens submitted to a machine-trained model. A "distributed vector," in turn, expresses the semantic content of an information item by distributing information over its k dimensions. A distributed vector is in contrast to a sparse one-hot vector that allocates particular dimensions of the vector to particular concepts. In some contexts, terms such as "component," "module," "engine," and "tool" refer to parts of computer-based technology that perform respective functions. FIG. 16, described below, provides examples of illustrative computing equipment for performing these functions.

A "language model" refers to a model that, in the present context, functions as a generative pattern completion engine. The pattern completion engine includes parameters that reflect statistical patterns that have been learned by performing training on a typically large collection of training examples. In an auto-regressive mode of operation, given a set of input tokens, the pattern completion engine predicts a next token that is most likely to follow the input tokens. The pattern completion engine then adds the predicted token to the end of the input tokens, to produce an updated set of input tokens, and then repeats its analysis for the updated set of tokens. This process continues until the pattern completion engine predicts a stop token, which is a signal that the auto-regression operation should terminate. In some implementations, a language model uses an attention mechanism to perform its predictions. The attention mechanism determines the relevance between pairs of tokens in the set of input tokens. Additional information regarding one illustrative implementation of the local language model 104 is set forth below in connection with the explanation of FIG. 14.

The local computing device 106 is any type of computing device, including any of a desktop computing device, a laptop computing device, a handheld computing device of any type (e.g., a smartphone or a tablet-type computing device), any type of mixed or virtual device or system, an intelligent appliance, a wearable computing device (e.g., a smart watch), an Internet-of-Things (IoT) device, a gaming system, a media device, a vehicle-borne computing system, any type of robot computing system, a computing system in a manufacturing system, etc. In whatever form it takes, the local computing device 106 typically has a modest amount of memory and processor resources to implement the local language model 104 and other applications, compared to a network-accessible server system.

Generally, profile information is information that represents the characteristics of a local entity. To facilitate explanation, many of the examples will present the case in which the local entity is an individual user, and thus "local entity" is used interchangeably with "user." Here, the customization performed by the local language model 104 constitutes personalization. In other examples, the local entity refers to two or more people, such as the members of a family or organization. Any example presented below that is framed in the context of a single user should be understood as applying to any kind of local entity. A local entity generally refers to whatever constitutes a scope of analysis when performing processing, here, when generating the profile information 114.

The content items 110 refer to any collection of text-bearing items associated with the local entity. For example, the content items 110 are associated with a user by virtue of the user having created them, liked them, commented on them, purchased by them, bookmarked them or otherwise selected them, etc. As a general characteristic, the content items 110 are associated with (or pertain to) a local entity by virtue of the local entity accepting the content items 110 as reference sources to be used in customization, where "acceptance" can assume at least any of the forms set forth above. The content items 110 include any combination of documents created by any type of text-editing program (memos, proposals, articles, books, etc.), slide presentations, images with text-based captions, messages (email messages, texts, etc.), blog posts, online reviews, and so on. A selection component 116 retrieves the content items from data sources 118. In some cases, the sources 118 refer to one or more data stores that are provided by the local computing device 106 itself. Alternatively, or in addition, the sources 118 refer to one or more data stores external to the local computing device 106 to which the user has access. For instance, at least some of these data stores are provided by a network-accessible data store associated with the user and to which the user has sole access.

More specifically, in some implementations, the content items 110 include different content items of the same type. For instance, content item(s) A 120 include one or more email messages (or parts thereof) authored by the user, content item(s) B 122 include one or more other email messages (or parts thereof) authored by the user, content item(s) C 124 include one or more other email messages (or parts thereof) authored by the user, and so on. For example, each of the content item(s) (120, 122, 124) constitutes a single sentence extracted from an email message written by the user. In other implementations, the content items 110 include two or more different categories or types of content items. For example, content item(s) A 120 include one or more articles written by the user, while content item(s) B 122 include one or more articles liked or bookmarked by the user, and so on. Additional information regarding this later multi-type implementation will be set forth below in connection with FIG. 9.

A content-providing system 126 provides the original information 108. In some examples, the content-providing system 126 is a network-accessible system that implements another language model (not shown in FIG. 1), referred to below as a global language model. A global model generally refers to a model that is accessible by, and provides service to, plural local devices. The global language model is larger than the local language model 104, where size depends on the number of parameters used by each language model. In some implementations, for instance, the local language model 104 is at least ten times smaller than the global language model. More specifically, for instance, the local language model 104 includes less than 1.5 billion parameters, while the global language model includes more than 10 billion parameters (and possibly includes several hundred billion parameters). Note that the principles described herein are not limited to specific model sizes, and the sizes of language models will change with different implementations; the salient point being made here is that the local language model 104 is significantly smaller than the global language model.

In some implementations, the content-providing system 126 uses the global language model to auto-regressively transform input information (expressed as a prompt) into the original information 108, token by token. The original information 108 may be considered generic or profile-agnostic user information because it has not yet been customized to reflect the profile of a local entity. Different local language models can use different profiles to customize the original information 108 in different ways. In other implementations, the global language model 208 applies some initial customization in the course of generating the original information 108. Here, the local language model 104 performs further customization based on the original information 108 and the profile information 114.

In other implementations, the content-providing system 126 is another kind of machine-trained model, besides a language model. In other implementations, the content-providing system 126 is a retrieval engine that identifies and retrieves the original information from a data store (not shown). For example, the content-providing system 126 retrieves a document that satisfies a retrieval condition specified in the input information; the text in that document, or a portion thereof, constitutes the original information 108. In other implementations, the content-providing system 126 is an editing program of any type that creates and/or edits a text-bearing item that is latter customized by the local language model 104. In other implementations, the content-providing system 126 is a browsing program that downloads a document from a network-accessible source.

In another implementation, the content-providing system 126 is a type of vector-based retrieval engine that finds a target vector that is a closest match to an input source vector in vector space (e.g., using cosine similarity or other type of distant metric). As a preliminary backend process, a neural network of any type converts each candidate target item (e.g., a document of any kind) into a particular target vector. Each vector is a distributed vector that conveys the semantics of its target item. The source vector is produced in the same manner at the time of request. The local language model 104 revises the retrieved target vector, which constitutes the original information 108, and then optionally converts the modified target vector back into text form.

Still other implementations of the content-providing system 126 are possible. Further note that, in other implementations, the content-providing system 126 is a component of the local computing device 106, or a component having functionality shared between the local computing device 106 and a server system. Further note that many of the examples presented herein are framed in the context in which the content items 110 and the information fed to the content-providing system 126 (if used) is text-based information. In other implementations, the content items 130 and/or the information fed to the content-providing system 126 include multi-modal content, which is content that includes any type or combination of types of content (text, audio, image, video, etc.). In some implementations, vision-transformer technology is used to convert image and/or video content into tokens (e.g., as described in Alexey Dosovitskiy, et al., "An Image is Worth 16×16 Words: Transformers for Image Recognition at Scale," arXiv, arXiv: 2010.11929v2 [cs.CV], June 3, 22 pages). Audio information is tokenizable into audio features (e.g., as described in Siddique Latif, et al., "Transformers in Speech Processing: A Survey," arXiv: 2303.11607v1 [cs.CL], Mar. 21, 2023, 27 pages).

A profile-generating component 128 uses machine-trained logic to transform the content items 110 into the profile information 114. The following explanation sets forth the parts of the profile-generating component 128 as individual components; however, in some implementations, these separate components constitute parts (e.g., layers) of a single machine-trained model.

Tokenizers 130 convert respective content items (120, 122, 124) into respective instances of token information. Tokenization entails breaking text into parts referred to as tokens. Tokenization is described in further detail below in connection with FIG. 14. Local encoders 132 (including local encoder A 134, local encoder B 136, and local encoder C 138) transform the instances of token information into instances of local encoded information. A global encoder 140 merges the local instances of encoded information into global encoded information, which is soft prompt information that constitutes the profile information 114. A soft prompt is information that conveys semantic content, but not necessarily in a form that is intelligible by a human on casual inspection, e.g., in the same way that fixed linguistic tokens are intelligible; the soft prompt information is abstract in that regard. In some implementations, the abstract or soft token(s) in a soft prompt are respective distributed vectors.

In some implementations, each of the local encoders 132 and the global encoder 140 is implemented by an encoder-based neural network. For instance, each of the local encoders 132 and the global encoder 140 is implemented by a transformer-based neural network (which uses layers devoted to attention). Additional information regarding a transformer-based architecture suitable for use in the profile-generating component 128 is described below in connection with FIG. 14. Other systems implement each encoder using another type of neural network, such as a feed-forward network, a convolutional neural network, etc., or any combination thereof. More generally, as used herein, "encoding" is intended to encompass any type of machine-trained mapping function that receives an input x and produces an encoded output y. Thus, "encoder" can be considered synonymous with "mapper."

A combining component 142 combines (e.g., concatenates) the profile information 114 with the original information 108 to produce combined information. The local language model 104 transforms the combined information to the customized information 112. In some implementations, the local language model 104 performs its transformation based on level information provided by a control component 146. The level information specifies an extent to which the original information 108 is to be modified by the characteristics represented by the profile information 114.

Finally, FIG. 1 shows that any post-processing system 148 is capable of making use of the customized information 112. For instance, assume that the customized information 112 is a personalized email message in draft form. Here, an email program enables the user to perform further editing on the email message, and then send the email message to one or more recipients.

Overall, the computing system 102 has at least the following technical merits. First, the local language model 104 makes relatively efficient use of memory and processing resources (compared, for instance, to a large multi-billion language model running on a server system). This characteristic enables the local language model to run on a local computing device, which typically has limited resources. This characteristic also reduces the carbon cost associated with running the local language model. The low resource demands of the local language model 104 also enable it to be fine-tuned on the local computing device 106 itself (as will be described below in connection with FIG. 10). The computing system 102 also provides a way to perform customization that does not involve transferring sensitive information to a server system. Further, the computing system 102 compresses a large amount of text-bearing content into profile information that the local language model 104 is capable of successfully processing (because it does not exceed the prompt size limits imposed by the local language model 104).

Figure 2:
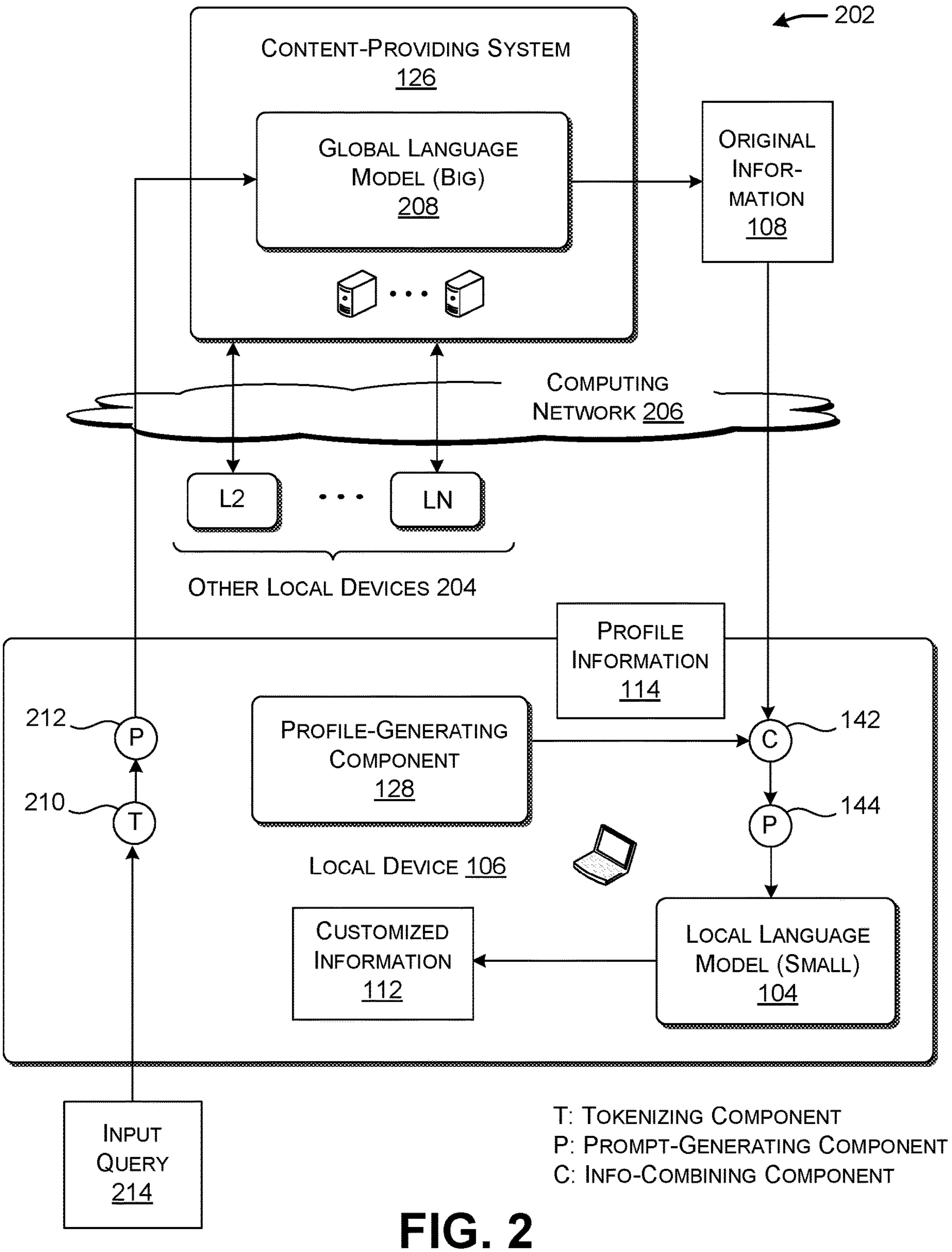
FIG. 2 shows one implementation of the computing system of FIG. 1 in which the local computing device interacts with a network-accessible global language model.

FIG. 2 shows a computing system 202 that represents one implementation of the computing system 102 of FIG. 2. The components of the computing system 202 that share the same reference numbers as the components in FIG. 1 perform the same functions described above with reference to FIG. 1.

In the computing system 202 of FIG. 2, the content-providing system 126 is a network-accessible server system implemented by one or more servers. The local computing device 106 and other local computing devices 204 interact with the content-providing system 126 via a computing network 206 of any type. For example, the computing network 206 represents a wide area network (e.g., the Internet) and/or a local area network.

The content-providing system 126 uses a global language model 208 to transform input information into the original information 108. In some implementations, the local computing device 106 produces the input information using a tokenizer 210 in conjunction with a prompt-generating component 212. That is, the tokenizer 210 converts an input query 214 into token information, and the prompt-generating component 212 produces a prompt that includes the token information.

Overall, the computing system 202 relies on the global language model 208 to provide an accurate response to the input query 214. The computing system 202 relies on the local language model 104 to perform the more limited role of revising the original information 108 to conform with the style and other personal expression preferences exhibited in the content items 110. In addition to the merits set forth above with respect to FIG. 1, the implementation of FIG. 2 is technically advantageous because the global language model 208 overcomes the drawbacks of the local language model 104, and vice versa. That is, the computing system 202 relies on the global language model 208 to produce accurate original information 108, thereby overcoming any weakness in the inference capabilities of the local language model 104 which are attributed to its small size. The local language model 108 performs the more limited role of customization of original information 108, which avoids the needs for sensitive items to be transferred to the global language model 208 for analysis. However, as noted above, other implementations do not rely on the use of the global language model 208.

Figure 3:
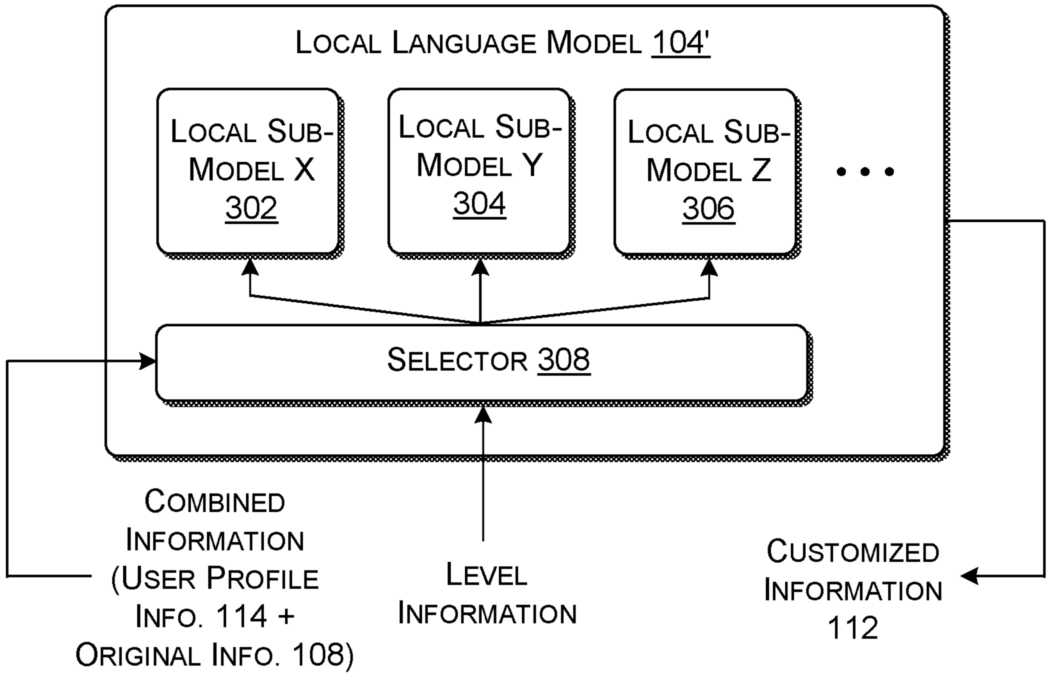
FIG. 3 shows one implementation of the local language model of FIG. 1.

FIG. 3 shows a local language model 104' that is one implementation of the local language model 104 of FIG. 1. The local language model 104' includes plural sub-models (302, 304, 306). Each sub-model is a machine-trained model that performs its transformation with respect to a particular level, as expressed by level information. Each level specifies an extent to which the original information 108 is to be modified based on the profile information 114. For example, the first sub-model 302 performs transformation according to a "simple" level setting, the second sub-model 304 performs transformation according to a "moderate" level setting, and the third sub-model 306 performs transformation according to an "intricate" level setting. The impact of each of these level settings will be described below in the context of the explanation of the example of FIG. 5. A selector 308 operates as a multiplexer by routing the combined information to whatever sub-model has been selected (based on the level information that has been input).

Figure 4:
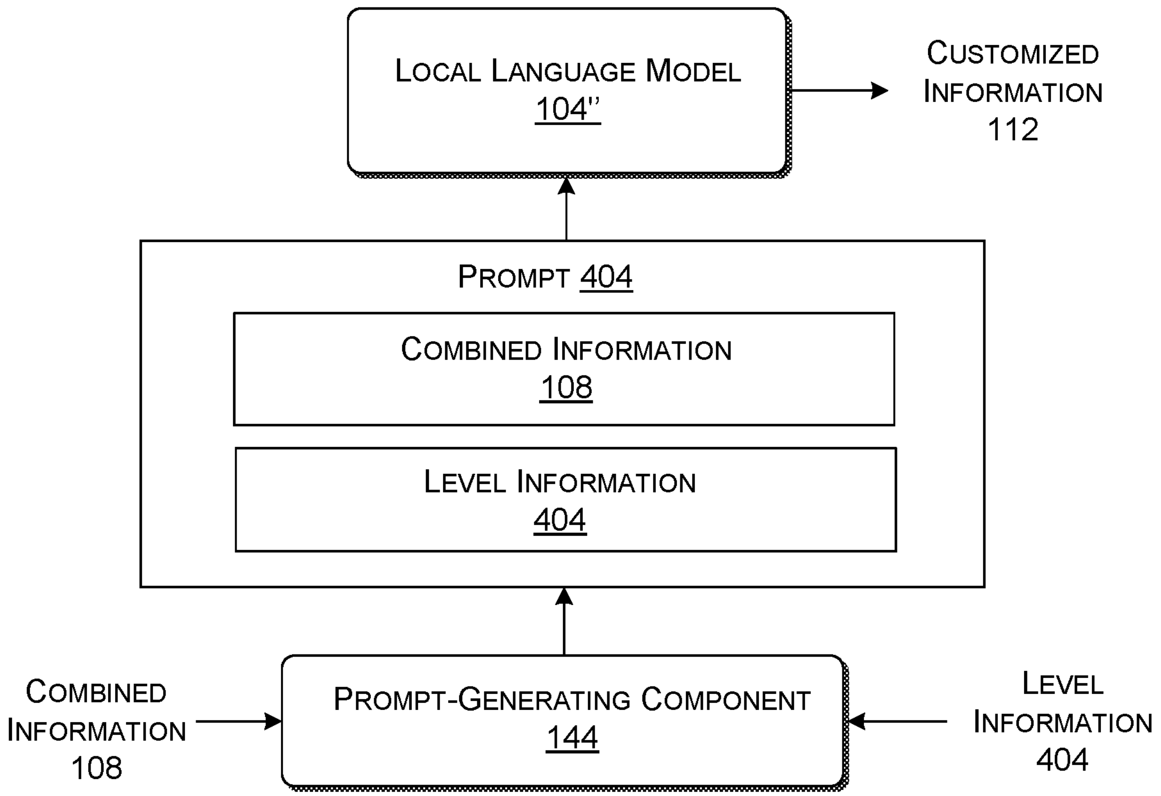
FIG. 4 shows another implementation of the local language model of FIG. 1.

FIG. 4 shows a local language model 104" that is another implementation of the language model 104 of FIG. 1. In this implementation, the local language model 104" applies the same machine-trained logic to interpret the combined information 108, and that logic is trained to perform inference based on the level selected by the control component 146. The prompt-generating component 144 produces a prompt 402 that includes the combined information 108 and level information 404 (which originates from the control component 146).

In any of the above-described implementations, the control component 146 can be implemented in different ways. In some implementations, the control component 146 allows any administrator or user to set the level, e.g., via a user interface configuration presentation (not shown). The administrator or user may reset the level for any reason at any frequency. For example, assume that a supervisor is using the computing system 102 to modify proposals written by a supervisee to better conform to proposals written by the supervisor. Further assume that the supervisee is newly hired and is therefore apt to produce proposals that do not conform to the best practices of this particular place of business. In view thereof, the supervisor uses the local language model 104 to automatically modify the supervisee's proposals with the level set to "intricate." The intricate setting causes the local language model 104 to perform relatively robust revision of the supervisee's proposals, but without changing their underlying meaning. The supervisor may choose the "simple" level for a more seasoned supervisee who writes proposals that generally conform to the best practices of this business.

In another implementation, the control component 146 uses a machine-trained classification model and/or rules based system to automatically choose the level. In the above example, for instance, the machine-trained model converts a set of proposals written by the supervisor to a first distributed vector and converts at least one proposal written by the supervisee to a second distributed vector. The control component 146 automatically selects a level based on a distance between the first vector and the second vector (which can be computed using any distance metric, such as cosine similarity). For instance, the control component 146 will choose the intricate level if the discrepancy between the supervisee's proposal and the supervisor's proposals exceeds a prescribed threshold.

Figure 5:
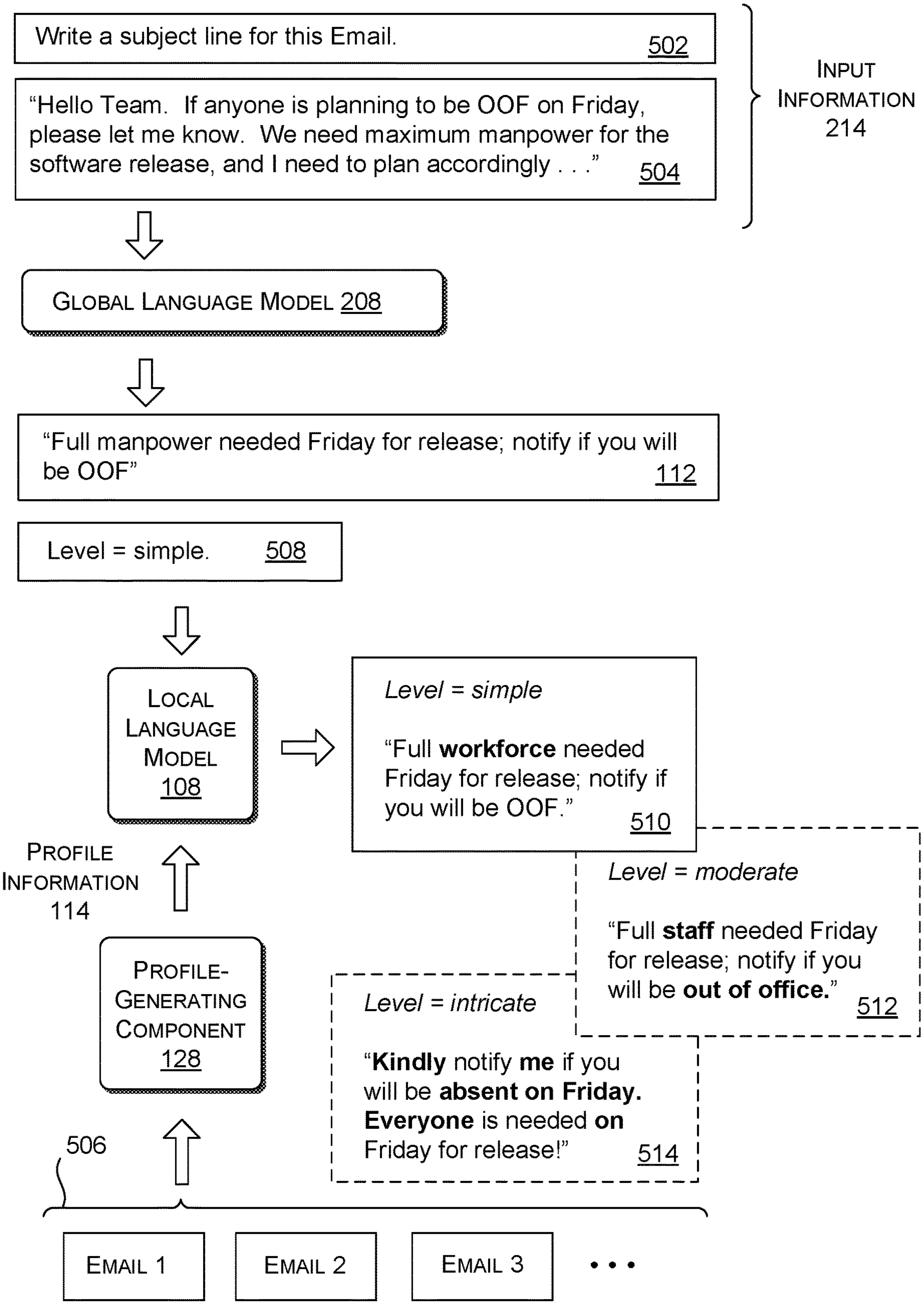
FIG. 5 shows one example of the operation of the computing system of FIG. 2.

FIG. 5 shows one example of the operation of the computing system 202 of FIG. 1 that uses both the global language model 208 and the local language model 104. Assume that the global language model 208 receives an input query 214 that includes a system prompt 502 that reads, "Write a subject line for this Email," and the text 504 of a particular email message. Assume that the global language model 208 transforms the input query 214 into the original information 108 that reads, "Full manpower needed Friday for release; notify if you will be OOF." In other implementations, the global language model 208 is not used, and the original information 108 is an original subject line in the particular email message.

More specifically, in one scenario, again assume that the user performing the customization is a supervisor who is overseeing the work of a supervisee. Assume that the supervisee writes a draft email that is being reviewed by the supervisor prior to it being sent. Assume that the supervisor first interacts with the global language model 208 to obtain a first-pass revision of the subject line. Thereafter, the supervisor relies on the local language model 104 to revise the subject line based so that it conforms to the expression style of the subject lines in the supervisor's own emails. In other implementations, the supervisor foregoes interaction with the global language model 208 and relies on the local language model 104 to revise the original subject line written by the supervisee.

The profile-generating component 128 transforms a set of email messages 506 (or portions thereof) written by the supervisor into the profile information 114. Alternatively, the email messages 506 may be assembled by the supervisor or some other individual because they are representative of good practice, but the supervisor has not authored all of these email messages 506 himself or herself. In either case, the email messages can be said to be associated with the supervisor because the supervisor has chosen these email messages to serve as reference sources.

Assume that the control component 146 specifies, via level information 508, that the level is "simple." This setting indicates that relatively small changes are to be made to the original information 108, e.g., by changing a single word. In response, assume that the local language model 104 converts the original information into customized information 510 that reads: "Full workforce need Friday for release; notify if you will be OOF." Here, "manpower" in the original information 108 has been changed to "workforce." This change may reflect the fact that the email messages 506 represented by the profile information 114 favor the use of gender-neutral terms.

Alternatively, assume that the level is set to "moderate." In response, assume that the local language model 104 produces the customized information 512 that reads: "Full staff needed Friday for release; notify if you will be out of office." Here, the local language model 104 has replaced "manpower" with "staff" for the same reasons stated above. The local language model 104 also replaces the acronym OOF with "out of office" to reflect the fact that the email messages 506 disfavor the use of acronyms.

Alternatively, assume that the level is set to "intricate." In response, assume that the local language model 104 produces the customized information 514 that reads: "Kindly notify me if you will be absent on Friday. Everyone is needed on Friday for release!" This revision changes multiple words in the original information 108, and also switches the first and second clauses in the original information 108 (e.g., by first stating the notification request, and then explaining why this request is being made). This structural revision reflects the fact that the prior email messages 506 most often lead with the request that is being made of others. In all of the above cases, the local language model 104 does not change the meaning of the original subject line (unless any error has been made).

In general, the local language model 104 makes some changes that reflect stylistic choices exhibited by the email messages 506. For example, the local language model 104 can conform to the user's proclivity to use (or not use) explanation marks in the prior email messages 506. Other revisions go beyond choice of words or punctation. For example, assume that the email messages exhibit a pattern in which the user is relatively concise when conveying certain topics (such as pleasantries), but chooses to elaborate on other topics (such as safety-related issues). The local language model 104 attempts to duplicate this pattern of expression when modifying the original information 108.

In a variant of the above scenario, the supervisor uses the above approach to modify an email message created by the supervisor, so that the email message more closely conforms with any reference corpus of email messages. That reference corpus may comprise emails written by the supervisor, or any other collection of email messages that the supervisor accepts as a reference source.

Figure 6:
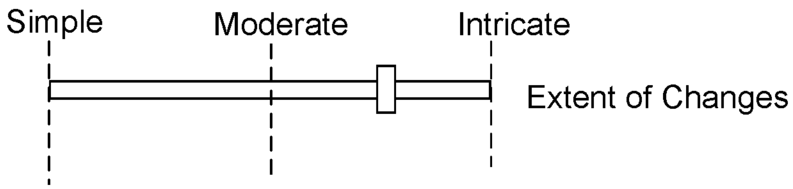
FIG. 6-8 shows various ways of implementing a control component in the computing system of FIG. 1. The control component produces level information that governs an extent to which the original information is modified based on the profile information.
Figure 7:
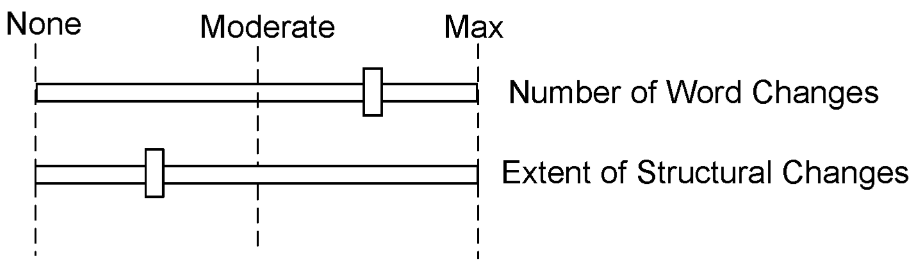
Figure 8:
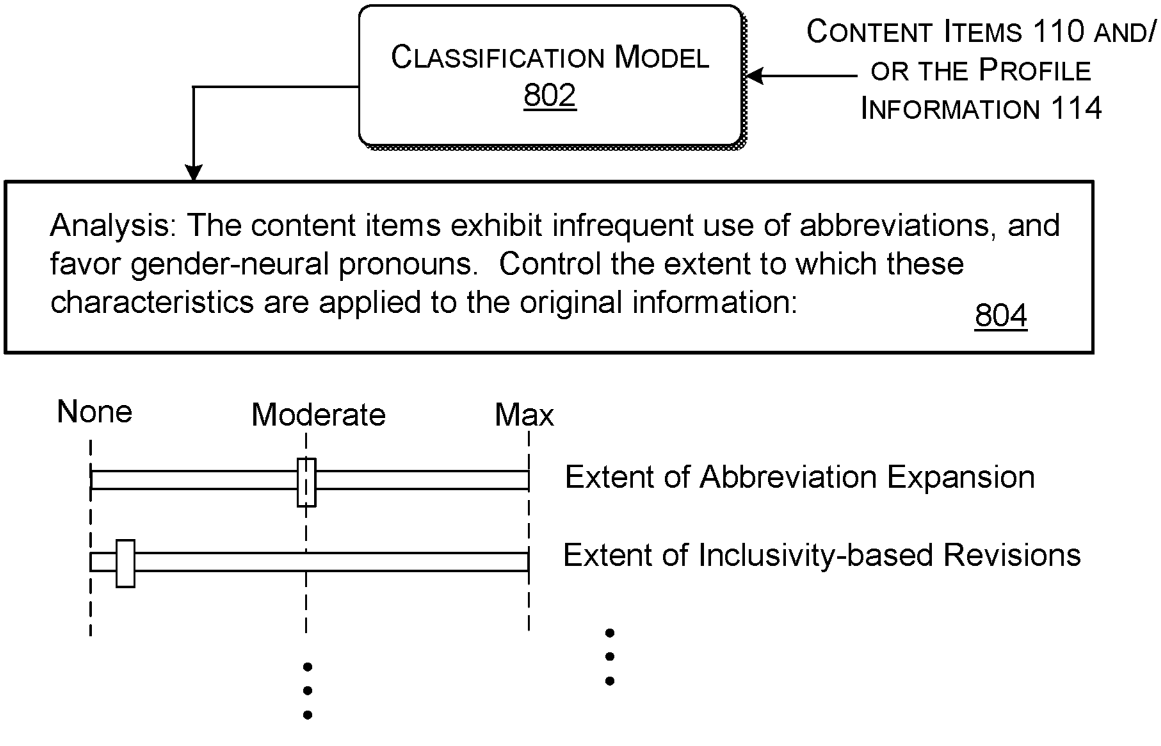

FIG. 6-8 shows various ways of implementing the control component 146 of FIG. 1. In FIG. 6, the control component 146 provides a user interface presentation that allows the user to choose a single level on a scale that runs from simple to intricate. In FIG. 7, the control component 146 provides a user interface presentation that allows the user to choose a first level that controls how many word substitutions are made to the original information 108, and a second level that controls an extent to which structural changes are made to the original information 108.

FIG. 8 shows an example of the control component 146 that uses a classification model 802 to analyze the proclivities exhibited in the content items 110 and/or in the profile information 114 (which itself is a distillation of the characteristics of the content items 110). The classification model 802 produces analysis information as a result of its analysis. The classification model 802 is implemented as any type of model, such as a BERT-type transformer model or convolutional neural network. The control component 146 provides a user interface presentation that allows the user to control the extent to which the original information 108 is modified to reflect any of the characteristics identified in the analysis information. For example, assume that the analysis information indicates that the user disfavors the use of abbreviations and favors the use of gender-neutral pronouns. A message 804 invites the user to control an extent to which the original information 108 will be modified to conform to each of these two characteristics. Alternatively, the control component 146 automatically adjusts settings to conform to the identified characteristics, and a user is free to further modify these settings.

Figure 9:
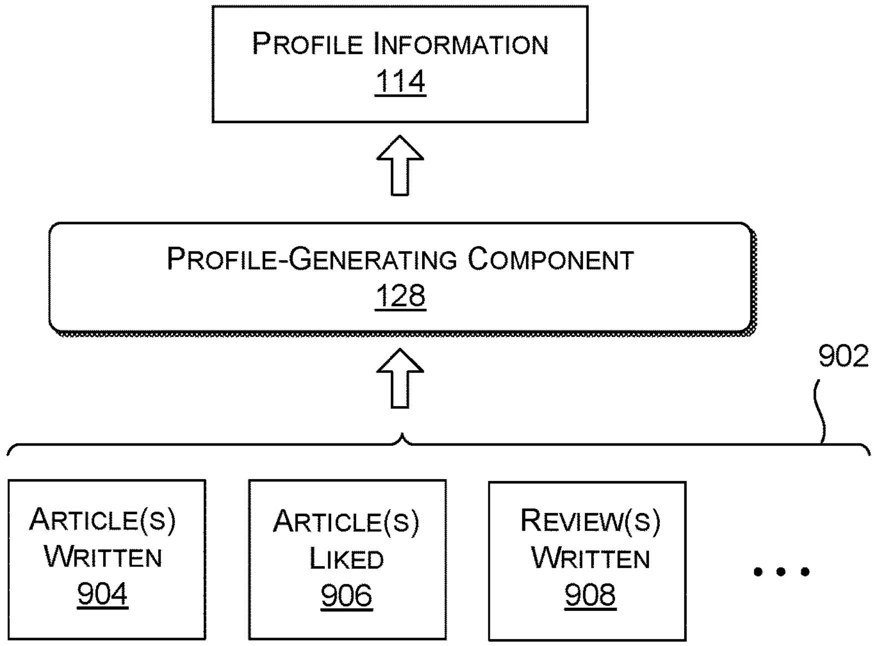
FIG. 9 shows an alternative way of collecting content items that will contribute to the generation of profile information.

FIG. 9 shows an alternative way of collecting content items 902 that will contribute to the generation of the profile information 114 in the computing system 102 of FIG. 1. In this variation, the content items 902 include different types of content items. For example, one or more first content items 904 correspond to one or more articles written by the user. One or more second content items 906 correspond to one or more articles that the user has liked. One or more other content items 908 correspond to product reviews that the user has written. Each of the local encoders 132 (in FIG. 1) is trained to interpret a particular class of content items. For example, the first local encoder A 134 is trained to interpret articles written by the user, while the second local encoder B 136 is trained to interpret articles liked by the user.

The global encoder 140 is trained to weight the different instances of local encoded information produced by the local encoders. This weighting is based on the learned relevance of the different instances of encoded information with respect to a particular type of original information 108 under consideration and a particular kind of transformation task that the local language model 104 is being asked to perform. For example, assume that the task assigned to the local language model 104 is to rewrite a product review expressed by the original information 108. Here, the global encoder 140 will assign the highest weight to prior product reviews written by the user. But the articles written by the user remain relevant because they reflect the user's stylistic choices and other expression-related choices. This is an example that demonstrates how the training of different machine-trained models used by the computing system 102 is interrelated.

In another example, the selection component 116 of the local computing device 106 dynamically constructs the set of content items 110 based on the context of a current personalization task. For instance, the selection component 116 operates as a retrieval engine (e.g., a vector-based retrieval engine) that extracts content items from the data sources 118 based on the input query 214 (of FIG. 2) and/or any other description of an objective of the customization task to be performed in particular case, and/or based on the original information 108. The purpose of this mode is to dynamically find the content items that are most appropriate reference sources for the particular configuration task being performed.

Figure 10:
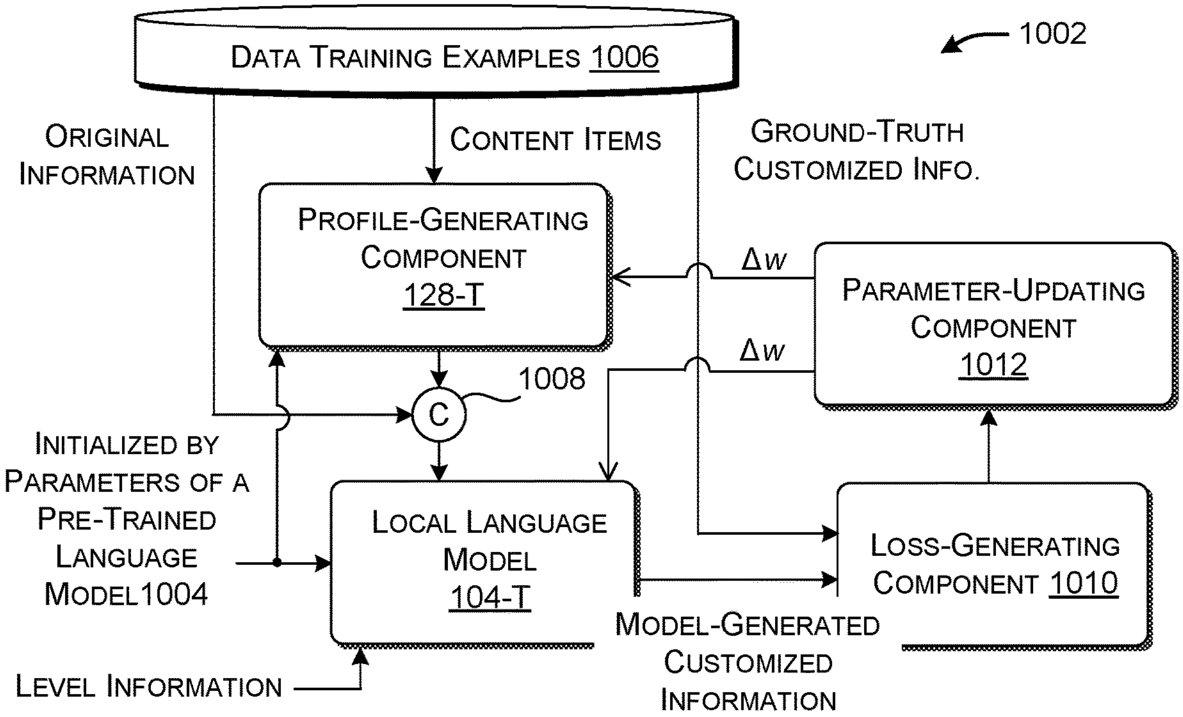
FIG. 10 shows a training system for training machine-trained models used in the computing system of FIG. 1.

FIG. 10 shows a training system 1002 for training the different machine-trained models that are used in the computing system 102 of FIG. 1. The models include the local language model 104 and the encoders (132, 140) in the profile-generating component 128. In FIG. 10, the local language model 104-T is the training-stage counterpart of the local language model 104, and the profile-generating component 128-T is the training-stage counterpart of the profile-generating component 128.

The training system 1002 makes relatively low resource demands because its machine-trained models themselves make low resource demands. As a result, the local computing device 106 is capable of performing the fine-tuning to be described below. This helps protect the privacy of the user because sensitive content need not be sent to a server system. Even if the training is performed on a separate computing device (besides the local computing device 104), the amount of machine-trained parameters is relatively small and is capable of being efficiently transferred to the local computing device (e.g., via network download).

In some implementations, the training performed by the training system 1002 constitutes fine-tuning a pre-trained language model 1004. One example of a publicly available pre-trained language model is described in Touvron, et al., "LLaMA: Open and Efficient Foundation Language Models," arXiv, arXiv: 2302.13971v1 [cs.CL], Feb. 27, 2023, 27 pages. Another example of a publicly available pre-trained model language model is the BLOOM model described in Scao, et al., "BLOOM: A 176B-Parameter Open-Access Multilingual Language Model," arXiv, arXiv: 2211.05100v2 [cs.CL], Dec. 11, 2022, 62 pages. In some examples, the pre-training of a generative language model includes unsupervised training using language modeling (e.g., predicting the next word in a given text passage and comparing the prediction with the actual next word) and supervised training (e.g., predicting an output result and comparing the prediction with a ground-truth result). Background on the general task of pre-training generative language models is provided in Radford, et al., "Improving Language Understanding by Generative Pre-training," OpenAI, San Francisco California, Jun. 11, 2018, 12 pages.

A data store 1006 stores a plurality of training examples on which training system 1002 performs training. An individual training example includes an instance of content items, an instance of original information, a ground-truth instance of customized information 112, and an instance of level information.

The training system 1002 trains the machine-trained models used in the computing system 102 in end-to-end fashion. For example, in the context of processing a training example, the profile-generating component 128-T produces model-generated profile information based on content items specified in the training example. A combining component 1008 combines the model-generated profile information with the original information specified in the training example, to produce combined information. The local language model 104-T transforms the combined information into a model-generated instance of customized information. A loss-generating component 1010 generates loss information based on a difference between the model-generated customized information and the ground-truth customized information specified in the training example. With respect to a batch of training examples, the loss-generating component 1010 can use cross entropy to compute the loss information. A parameter-updating component 1012 updates the parameters of the profile-generating component 128-T and the local language model 104-T based on the loss information, e.g., using stochastic gradient descent in combination with back propagation. The machine-trained models are trained in an end-to-end fashion because the loss information reflects the performance of the entire computing system 102, rather than the performance of individual parts of the computing system 102 when considered in isolation.

Other implementations train a delta-version of the machine-trained models, which results in the generation of smaller machine-trained models. Background information on the general topic of training delta versions of machine-trained models can be found at: Hu, at al., "LoRA: Low-Rank Adaptation of Large Language Models," arXiv, Cornell University, arXiv: 2106.09685v2 [cs.CL], Oct. 16, 2021, 26 pages.

FIG. 11 shows the performance of the computing system 202 of FIG. 2 for different sizes of the local language model 104 (Small, Medium, and Large) and for different sizes of the global language model 208 (Big Generic, and Smaller Generic). For example, each version of the local language model 104 is a GPT2 model provided by OpenAI having a particular size identified in FIG. 11 (117 M for small, 500 M for medium, and 774 M parameters for large). The Big Generic global language model is implemented by a GPT4 model provided by OpenAI, and the Smaller Generic global language model is implemented as a Llama2 model having a size of 13 B parameters. Rouge-1 is a well-known metric that measures the extent of gram-related overlap between model-generating results and ground-truth results. PRP (perplexity) reflects an extent to which a distribution of model-generated results matches ground-truth results. FIG. 11 generally shows that the accuracy of the local language model 104 in performing an article headline personalization task increases with the size of the local language model 104. The performance also increases with the size of the global language model 208.

FIG. 12 shows the performance of the computing system 202 of FIG. 2 for different versions of the profile information 114. In a first variation, the profile information 114 is replaced with random information. In a second variation, the profile information 114 is omitted and not replaced with an alternative. In a third variation, the profile information 114 for a user is replaced with the profile information of another user. In the fourth case ("regular"), the profile information 114 is produced in the same manner described above with respect to FIG. 1 (in which the profile information 114 correctly reflects the characteristics of the content items 110 of the user who is performing the customization). FIG. 12 generally conveys that the use of the profile information 114, as constituted in the manner described with reference to FIG. 1, improves the accuracy of the local language model 104.

Figure 13:
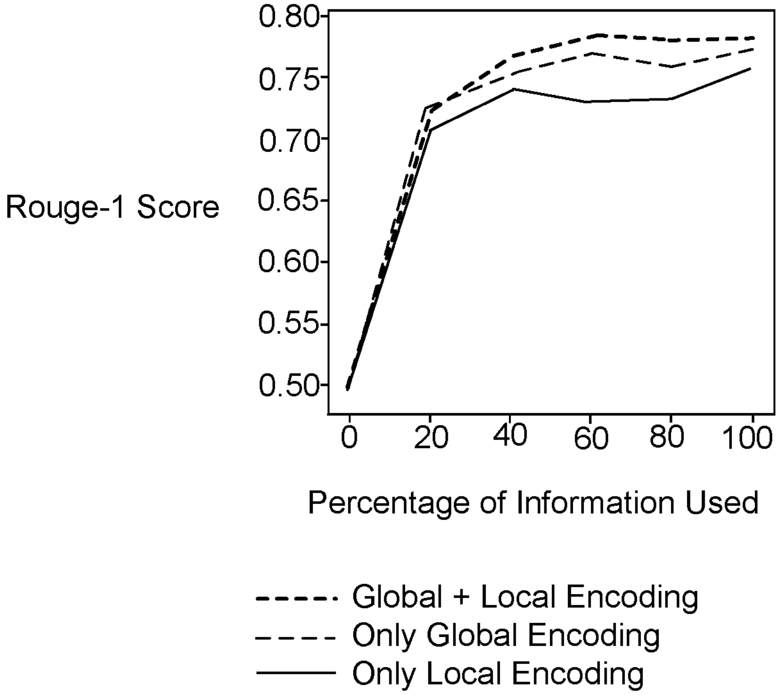
FIG. 13 shows the performance of the computing system of FIG. 2 with respect to different strategies for generating profile information.

FIG. 13 shows the performance of the local language model 104 in the computing system 202 of FIG. 2 for the task of article headline personalization task, with respect to different implementations of the profile-generating component 128. The variations include: a) the use of both the local encoders 132 and the global encoder 140, b) the use of just the global encoder 140, and c) the use of just the local encoders 132. The vertical axis represents rouge-1 scores and the horizontal axis represents the percentage of the amount of available user information (for use in generating the user profile information 114) that has been used to train the computing system 202. FIG. 13 shows that the use of both the local encoders 132 and the global encoder 140 produces the most accurate results. Further, as more information is added, the accuracy increases, although the rate of improvement slows beyond a certain amount of information).

Figure 14:
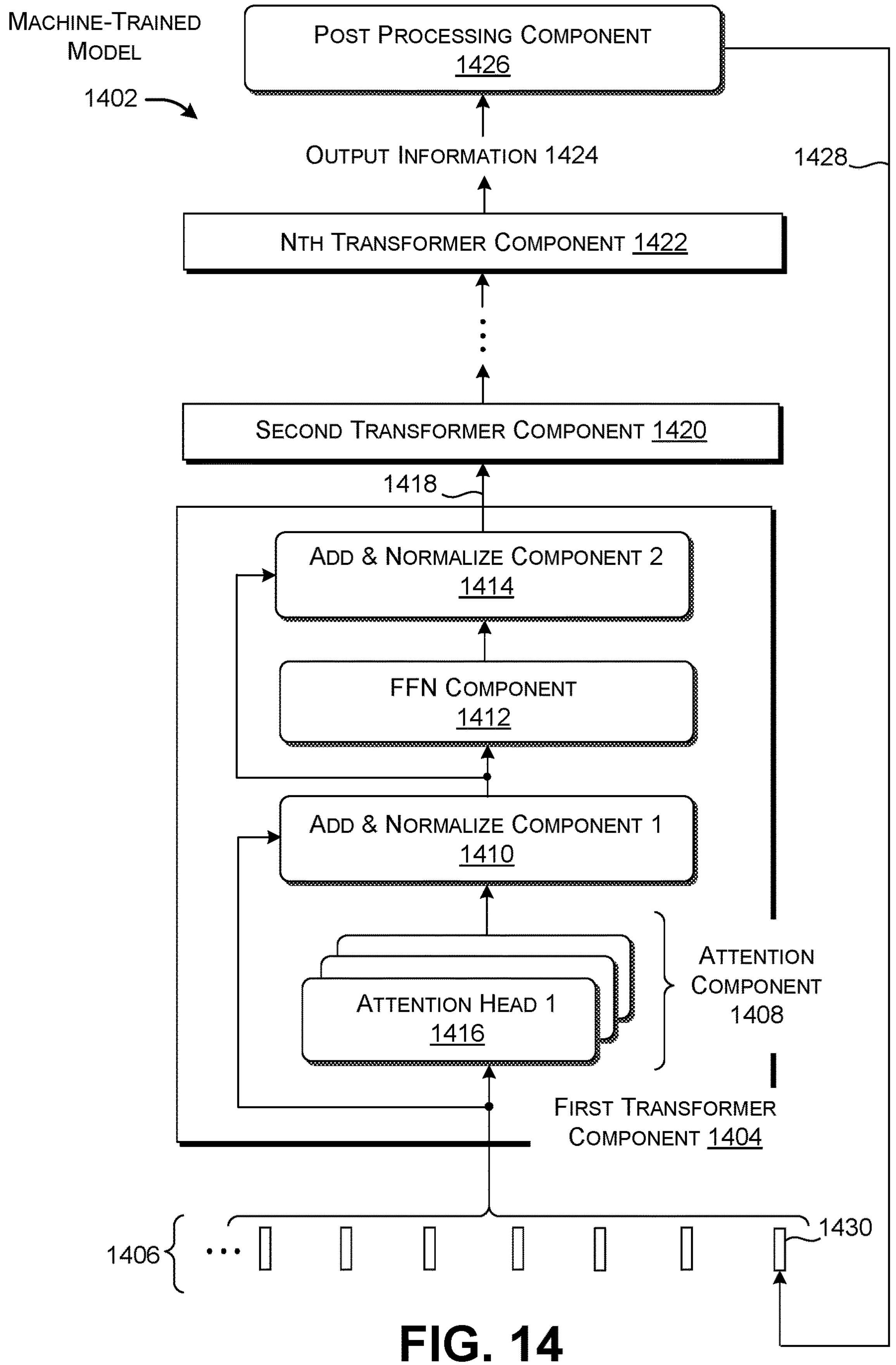
FIG. 14 shows one implementation of a language model for use in the computing system of FIG. 1.

FIG. 14 shows a transformer-based language model ("language model") 1402 for implementing the local language model 104 of FIG. 1, the global language model 208 (of FIG. 2) (if used), each of the local encoders 132, and the global encoder 140. The language model 1402 is composed, in part, of a pipeline of transformer components, including a first transformer component 1404. FIG. 14 provides details regarding one way of implementing the first transformer component 1404. Although not specifically illustrated, other transformer components of the language model 1402 have the same architecture and perform the same functions as the first transformer component 1404 (but are governed by separate sets of weights).

The language model 1402 commences its operation with the receipt of input information, such as a passage of text. The input information includes a series of linguistic tokens. In some examples, a "token" refers to a unit of text having any granularity, such as an individual word, a word fragment produced by byte pair encoding (BPE), a character n-gram, a word fragment identified by the WordPiece or SentencePiece algorithm, etc. To facilitate explanation, assume that each token corresponds to a complete word. The principles set forth herein, however, are not limited to the processing of text information; in other examples, the language model 1402 operates on any of: audio information, image information, video information, sensor information, and so on, or any combination thereof.

Next, an embedding component (not shown) maps the sequence of tokens into respective token embeddings. For example, the embedding component produces one-hot vectors that describe the tokens, and then maps the one-hot vectors into the token embeddings using a machine-trained linear transformation. The embedding component then adds position information (and, in some cases, segment information) to the respective token embeddings to produce position-supplemented embedding vectors 1406. The position information added to each token embedding describes the embedding vector's position in the sequence of token embeddings.

The first transformer component 1404 operates on the position-supplemented embedding vectors 1406. In some implementations, the first transformer component 1404 includes, in order, an attention component 1408, a first add-and-normalize component 1410, a feed-forward neural network (FFN) component 1412, and a second add-and-normalize component 1414.

The attention component 1408 determines how much emphasis should be placed on parts of input information when interpreting other parts of the input information. Consider, for example, a sentence that reads: "I asked the professor a question, but he could not answer it." When interpreting the word "it," the attention component 1408 will determine how much weight or emphasis should be placed on each of the words of the sentence. The attention component 1408 will find that the word "question" is most significant.

The attention component 1408 performs attention analysis using the following equation:

$$\text{Attention}(Q, K, V) = \text{softmax}\left(\frac{QK^T}{\sqrt{d_k}}\right)V. \tag{1}$$

The attention component 1408 produces query information Q by multiplying the position-supplemented embedding vectors 1406 (or just the position-supplemented vector associated with the last-generated token) by a query weighting matrix $W^Q$. Similarly, the attention component 1408 produces key information K and value information V by multiplying the position-supplemented embedding vectors 1406 by a key weighting matrix $W^K$ and a value weighting matrix $W^V$, respectively. To execute Equation (1), the attention component 1408 takes the dot product of Q with the transpose of K, and then divides the dot product by a scaling factor $\sqrt{d}$, to produce a scaled result. The symbol d represents the dimensionality of Q and K. The attention component 1408 takes the Softmax (normalized exponential function) of the scaled result, and then multiplies the result of the Softmax operation by V, to produce attention output information. In some cases, the attention component 1408 is said to perform masked attention insofar as the attention component 1408 masks output token information that, at any given time, has not yet been determined. Background information regarding the general concept of attention is provided in Vaswani, et al., "Attention Is All You Need," in 31st Conference on Neural Information Processing Systems (NIPS 2017), 2017, 11 pages.

Note that FIG. 14 shows that the attention component 1408 is composed of plural attention heads, including a representative attention head 1416. Each attention head performs the computations specified by Equation (1), but with respect to a particular representational subspace that is different than the subspaces of the other attention heads. To accomplish this operation, the attention heads perform the computations described above using different respective sets of query, key, and value weight matrices. Although not shown, the attention component 1408 concatenates the output results of the attention component's separate attention heads, and then multiplies the results of this concatenation by another weight matrix $W^O$.

The add-and-normalize component 1410 includes a residual connection that combines (e.g., sums) input information fed to the attention component 1408 with the output information generated by the attention component 1408. The add-and-normalize component 1410 then normalizes the output information generated by the residual connection, e.g., by layer-normalizing values in the output information based on the mean and standard deviation of those values, or by performing root-mean-squared normalization. The other add-and-normalize component 1414 performs the same functions as the first-mentioned add-and-normalize component 1410. The FFN component 1412 transforms input information to output information using a feed-forward neural network having any number of layers.

The first transformer component 1404 produces output information 1418. A series of other transformer components (1420, . . . , 1422) perform the same functions as the first transformer component 1404, each operating on output information produced by its immediately preceding transformer component. Each transformer component uses its own level-specific set of machine-trained weights. The final transformer component 1422 in the language model 1402 produces final output information 1424.

When applied to a local encoder, the final output information 1424 represents an instance of local encoded information. When applied to the global encoder 140, the final output encoded information 1424 represents the global encoded information (which also constitutes the profile information 114).

When applied to either the local language model 104 or the global language model 208, a post-processing component 1426 performs post-processing operations on the final output encoded information 1424. For example, the post-processing component 1426 performs a machine-trained linear transformation on the final output encoded information 1424 and processes the results of this transformation using a Softmax component (not shown). The language model 1402 uses the output of the post-processing component 1426 to predict the next token in the input sequence of tokens. In some applications, the language model 1402 performs this task using a greedy selection approach (e.g., by selecting the token having the highest probability), or by using the beam search algorithm (e.g., by traversing a tree that expresses a search space of candidate next tokens).

The language model 1402, when applied to the role of the local language model 104 or the global language model 208, operates in an auto-regressive manner, as indicated by the loop 1428. To operate in this way, the language model 1402 appends a predicted token to the end of the sequence of input tokens, to provide an updated sequence of tokens. The predicted token leads to the production of a new position-supplemented vector 1430. In a next pass, the language model 1402 processes the updated sequence of position-supplemented vectors to generate a next predicted token. The language model 1402 repeats the above process until it generates a specified stop token.

The above-described implementation of the language model 1402 relies on a decoder-only architecture. Other implementations of the language model 1402 use an encoder-decoder transformer-based architecture. Here, a transformer-based decoder receives encoder output information produced by a transformer-based encoder, together with decoder input information. The encoder output information specifically includes KV information that serves an input to the attention components of the decoder (except the first transformer component).

Other implementations of the language model 1402 use other kinds of machine-trained models besides, or in addition to, the particular transformer-based architecture shown in FIG. 14. The other machine-trained models include any of convolutional neural networks (CNNs), recurrent neural networks (RNNs), fully-connected feed-forward neural networks (FFNS), stable diffusion models, etc., or any combination thereof.

FIG. 15 is a flowchart that represents an overview of the operation of the computing system 102 of FIG. 1. Each of the processes is expressed as a series of operations performed in a particular order. But the order of these operations is merely representative, and the operations are capable of being varied in other implementations. Further, any two or more operations described below are capable of being performed in a parallel manner. In one implementation, the blocks shown in the processes that pertain to processing-related functions are implemented by the computing equipment described in connection with FIG. 14.

More specifically, FIG. 15 shows a process 1502 for generating customized information in a local computing device (e.g., the local computing device 106) that is associated with a local entity (e.g., a user). In block 1504, the local computing device 106 receives original information (e.g., the original information 108) from a content-providing system (e.g., the content-providing system 126). In block 1506, the local computing device 106 receives plural content items (e.g., the content items 110) that pertain to the local entity, and encodes the plural content items to generate plural instances of local encoded information using plural machine-trained local encoders (e.g., the local encoders 132). In block 1508, the local computing device 106 encodes the plural instances of local encoded information into profile information (e.g., the profile information 114) using a machine-trained global encoder (e.g., the global encoder 140), the profile information representing a profile of the local entity as expressed by the plural content items. In block 1510, the local computing device 106 combines the original information with the global encoded information, to produce combined information. In block 1512, the local computing device 106 optionally receives level information that specifies an extent of transformation to be applied to the original information. In block 1514, the local computing device 106 transforms the combined information into customized information (e.g., the customized information 112) based on the level information using a local language model (e.g., the local language model 104), the customized information being a version of the original information that expresses influence of the profile information.

FIG. 16 shows a computing system 1602 that, in some implementations, is used to implement any aspect of the mechanisms set forth in the above-described figures. For instance, in some implementations, the type of computing system 1602 shown in FIG. 16 is used to implement the local computing device 106 of FIG. 1 or any server shown in FIG. 2. In all cases, the computing system 1602 represents a physical and tangible processing mechanism.

The computing system 1602 includes a processing system 1604 including one or more processors. The processor(s) include one or more central processing units (CPUs), and/or one or more graphics processing units (GPUs), and/or one or more application specific integrated circuits (ASICs), and/or one or more neural processing units (NPUs), and/or one or more tensor processing units (TPUs), etc. More generally, any processor corresponds to a general-purpose processing unit or an application-specific processor unit.

The computing system 1602 also includes computer-readable storage media 1606, corresponding to one or more computer-readable media hardware units. The computer-readable storage media 1606 retains any kind of information 1608, such as machine-readable instructions, settings, model weights, and/or other data. In some implementations, the computer-readable storage media 1606 includes one or more solid-state devices, one or more hard disks, one or more optical disks, etc. Any instance of the computer-readable storage media 1606 uses any technology for storing and retrieving information. Further, any instance of the computer-readable storage media 1606 represents a fixed or removable unit of the computing system 1602. Further, any instance of the computer-readable storage media 1606 provides volatile and/or non-volatile retention of information. The specific term "computer-readable storage medium" or "storage device" expressly excludes propagated signals per se in transit; a computer-readable storage medium or storage device is "non-transitory" in this regard.

The computing system 1602 utilizes any instance of the computer-readable storage media 1606 in different ways. For example, in some implementations, any instance of the computer-readable storage media 1606 represents a hardware memory unit (such as random access memory (RAM)) for storing information during execution of a program by the computing system 1602, and/or a hardware storage unit (such as a hard disk) for retaining/archiving information on a more permanent basis. In the latter case, the computing system 1602 also includes one or more drive mechanisms 1610 (such as a hard drive mechanism) for storing and retrieving information from an instance of the computer-readable storage media 1606.

In some implementations, the computing system 1602 performs any of the functions described above when the processing system 1604 executes computer-readable instructions stored in any instance of the computer-readable storage media 1606. For instance, in some implementations, the computing system 1602 carries out computer-readable instructions to perform each block of the processes described with reference to FIG. 15. FIG. 16 generally indicates that hardware logic circuitry 1612 includes any combination of the processing system 1604 and the computer-readable storage media 1606.

In addition, or alternatively, the processing system 1604 includes one or more other configurable logic units that perform operations using a collection of logic gates. For instance, in some implementations, the processing system 1604 includes a fixed configuration of hardware logic gates, e.g., that are created and set at the time of manufacture, and thereafter unalterable. In addition, or alternatively, the processing system 1604 includes a collection of programmable hardware logic gates that are set to perform different application-specific tasks. The latter category of devices includes programmable array logic devices (PALs), generic array logic devices (GALs), complex programmable logic devices (CPLDs), field-programmable gate arrays (FPGAs), etc. In these implementations, the processing system 1604 effectively incorporates a storage device that stores computer-readable instructions, insofar as the configurable logic units are configured to execute the instructions and therefore embody or store these instructions.

In some cases (e.g., in the case in which the computing system 1602 represents a user computing device), the computing system 1602 also includes an input/output interface 1614 for receiving various inputs (via input devices 1616), and for providing various outputs (via output devices 1618). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1620 and an associated graphical user interface presentation (GUI) 1622. The display device 1620 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1602 also includes one or more network interfaces 1624 for exchanging data with other devices via one or more communication conduits 1626. One or more communication buses 1628 communicatively couple the above-described units together.

The communication conduit(s) 1626 is implemented in any manner, e.g., by a local area computer network, a wide area computer network (e.g., the Internet), point-to-point connections, or any combination thereof. The communication conduit(s) 1626 include any combination of hardwired links, wireless links, routers, gateway functionality, name servers, etc., governed by any protocol or combination of protocols.

FIG. 16 shows the computing system 1602 as being composed of a discrete collection of separate units. In some cases, the collection of units corresponds to discrete hardware units provided in a computing device chassis having any form factor. FIG. 16 shows illustrative form factors in its bottom portion. In other cases, the computing system 1602 includes a hardware logic unit that integrates the functions of two or more of the units shown in FIG. 16. For instance, in some implementations, the computing system 1602 includes a system on a chip (SoC or SOC), corresponding to an integrated circuit that combines the functions of two or more of the units shown in FIG. 16.

The following summary provides a set of illustrative examples of the technology set forth herein.

(A1) According to one illustrative aspect, a method (e.g., the process 1502) is described for generating customized information (e.g., the customized information 112) in a local computing device (e.g., the local computing device 106) that is associated with a local entity (e.g., a user or group of users). The method includes: receiving (e.g., in block 1504) original information (e.g., the original information 108) at the local computing device from a content-providing system (e.g., the content-providing system 126); receiving (e.g., in block 1506) plural content items that pertain to the local entity, and encoding, at the local computing device, the plural content items to generate plural instances of local encoded information using plural machine-trained local encoders (e.g., the encoders 132); encoding (e.g., in block 1508), at the local computing device, the plural instances of local encoded information into profile information (e.g., the profile information 114) using a machine-trained global encoder (e.g., the global encoder 140), the profile information representing a profile of the local entity as expressed by the plural content items; combining (e.g., in block 1510), at the local computing device, the original information with the global encoded information, to produce combined information; receiving (e.g., in block 1512) level information that specifies an extent of transformation to be applied to the original information; and transforming (e.g., in block 1514), at the local computing device, the combined information into the customized information based on the level information using a local language model (e.g., the local language model 104), the customized information being a version of the original information that expresses influence of the profile information.

(A2) According to some implementations of the method of A1, the content-providing system is accessible to other local computing devices via a computing network, the other local computing devices being associated with other respective local entities having other profiles.

(A3) According to some implementations of the methods of A1 or A2, the content-providing system is another language model.

(A4) According to some implementations of any of the methods of A1-A3, the content-providing system uses a first set of parameters and consumes a first amount of resources, and the local language model uses a second set of parameters and consumes a second amount of resources, the second set of parameters being less than the first set of parameters, and the second amount being less than the first amount.

(A5) According to some implementations of any of the methods of A1-A4, the local entity is a user who is associated with the local computing device, and wherein the plural content items are content items associated with the user.

(A6) According to some implementations of any of the methods of A1-A5, the plural content items are associated with a single type.

(A7) According to some implementations of any of the methods of A1-A5, the plural content items include plural subsets of content items associated with different respective types.

(A8) According to some implementations of any of the methods of A1-A8, each machine-trained local encoder is an attention-based neural network, and the machine-trained global encoder is implemented by another attention-based neural network.

(A9) According to some implementations of the method of A8, each attention-based neural network is a transformer neural network.

(A10) According to some implementations of any of the methods of A1-A9, the level information specifies a quantity of changes to be made to the original information and/or a type of changes to be made to the original information.

(A11) According to some implementations of any of the methods of A1-A10, the method further includes identifying characteristics of the profile information. The level information that is received specifies an extent to which each of the characteristics is to be applied to the original information.

(A12) According to some implementations of any of the methods of A1-A11, the local language model includes plural level-specific local language models, wherein the method includes selecting one of the level-specific local language models based on the level information that has been specified.

(A13) According to some implementations of any of the methods of A1-A11, the local language model uses a single set of machine-trained parameters to interpret a prompt that expresses the level information and the combined information.

(A14) According to some implementations of any of the methods of A1-A13, the method further includes end-to-end training the local encoders, the global encoder, and the local language model on the local computing device.

(B1) According to another illustrative aspect, a method (e.g., the process 1502) is described for providing customized information (e.g., the customized information 112). The method is performed by a local computing device (e.g., the local computing device 106) and is associated with a local entity. The method incudes: receiving (e.g., in block 1504) original information (e.g., the original information 108) at the local computing device from a content-providing system (e.g., the content-providing system 126), the content-providing system also being accessible to other local computing devices (e.g., the other local devices 204) via a computing network (e.g., the computer network 206), the other local computing devices being associated with other respective local entities; receiving (e.g., in block 1506), at the local computing device, plural content items that pertain to the local entity, and encoding the plural content items to generate plural instances of local encoded information using plural machine-trained local encoders (e.g., the encoders 132); encoding (e.g., in block 1508), at the local computing device, the plural instances of local encoded information into profile information (e.g., the profile information 114) using a machine-trained global encoder (e.g., the global encoder 140), the profile information using token information to represent a profile of the local entity as expressed by the plural content items; combining (e.g., in block 1510), at the local computing device, the original information with the profile information, to produce combined information; and transforming (e.g., in block 1514), using memory (e.g., the computer-readable storage media 1606) and a processing system (e.g., the processing system 1604) of the local computing device, the combined information into the customized information using a local language model, the customized information being a version of the original information that expresses influence of the profile information. The content-providing system uses a first set of parameters and consumes a first amount of resources, and the local language model uses a second set of parameters and consumes a second amount of resources. The second set of parameters is less than the first set of parameters, and the second amount is less than the first amount.

In yet another aspect, some implementations of the technology described herein include a computing system (e.g., the computing system 1602) that includes a processing system (e.g., the processing system 1604) having a processor. The computing system also includes a storage device (e.g., the computer-readable storage media 1606) for storing computer-readable instructions (e.g., the information 1608). The processing system executes the computer-readable instructions to perform the operations described herein, e.g., in any of the methods of A1-A14 or B1.

In yet another aspect, some implementations of the technology described herein include a computer-readable storage medium (e.g., the computer-readable storage media 1606) for storing computer-readable instructions (e.g., the information 1608). A processing system (e.g., the processing system 1604) executes the computer-readable instructions to perform the operations described herein, e.g., the operations of any of the methods of A1-A14 or B1.

More generally stated, any of the individual elements and steps described herein are combinable into any logically consistent permutation or subset. Further, any such combination is capable of being manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

This description may have identified one or more features as optional. This type of statement is not to be interpreted as an exhaustive indication of features that are to be considered optional; generally, any feature is to be considered as an example, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the phrase "configured to" encompasses various physical and tangible mechanisms for performing an identified operation. The mechanisms are configurable to perform an operation using the hardware logic circuitry 1612 of FIG. 16. The term "logic" likewise encompasses various physical and tangible mechanisms for performing a task. For instance, each processing-related operation illustrated in the flowchart of FIG. 15 corresponds to a logic component for performing that operation.

Further, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. The phrase "A corresponds to B" means "A is B" in some contexts. The term "prescribed" is used to designate that something is purposely chosen according to any environment-specific considerations. For instance, a threshold value or state is said to be prescribed insofar as it is purposely chosen to achieve a desired result. "Environment-specific" means that a state is chosen for use in a particular environment. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating customized information in a local computing device that is associated with a local entity, comprising:

providing a query to a content-providing system;

receiving, in response to the query, original information at the local computing device from the content-providing system, the content-providing system also being accessible to other local computing devices via a computing network, the other local computing devices being associated with other respective local entities;

receiving, at the local computing device, plural content items that pertain to the local entity, and encoding the plural content items to generate plural instances of local encoded information using plural machine-trained local encoders;

encoding, at the local computing device, the plural instances of local encoded information into profile information using a machine-trained global encoder, the profile information using token information to represent a profile of the local entity as expressed by the plural content items;

after the profile information is produced by the encoding, combining, at the local computing device, token information of the original information with the token information of the profile information, to produce combined information;

producing a prompt that includes the combined information;

receiving level information that specifies an extent of transformation to be applied to the original information, the level information specifying a quantity of changes to be made to the original information by a local generative language model and/or a type of changes to be made to the original information by the local generative language model; and transforming the prompt into the customized information based on the level information using the local generative language model, the customized information being a version of the original information that expresses influence of the profile information to the extent specified by the level information, the content-providing system using a first set of parameters and consuming a first amount of resources, and the local generative language model using a second set of parameters and consuming a second amount of resources, the second set of parameters being less than the first set of parameters, and the second amount being less than the first amount.

2. The method of claim 1, wherein the content-providing system is another language model.

3. The method of claim 1, wherein the local entity is a user who is associated with the local computing device, and wherein the plural content items are content items associated with the user.

4. The method of claim 1, wherein the plural content items are associated with a single type.

5. The method of claim 1, wherein the plural content items include plural subsets of content items associated with different respective types.

6. The method of claim 1, wherein each machine-trained local encoder is an attention-based neural network, and wherein the machine-trained global encoder is implemented by another attention-based neural network.

7. The method of claim 1, wherein the local generative language model includes plural level-specific local generative language models, wherein the method includes selecting one of the level-specific local generative language models based on the level information that has been specified.

8. The method of claim 1, wherein the local generative language model uses a single set of machine-trained parameters to interpret the prompt, and wherein the prompt also expresses the level information.

9. The method of claim 1, further comprising end-to-end training the local encoders, the global encoder, and the local generative language model on the local computing device.

10. The method of claim 1, wherein the user profile information is soft token information, and wherein the combining concatenates the soft token information of the user profile information with the token information of the original information.

11. A local computing device, associated with a local entity, for providing customized information, comprising:

a memory; and a processing system for executing computer-readable instructions stored in the memory, to perform operations including:

providing a query to a content-providing system;

receiving, in response to the query, original information at the local computing device from the content-providing system, the content-providing system also being accessible to other local computing devices via a computing network, the other local computing devices being associated with other respective local entities;

receiving, at the local computing device, plural content items that pertain to the local entity, and encoding the plural content items to generate plural instances of local encoded information using plural machine-trained local encoders;

encoding, at the local computing device, the plural instances of local encoded information into profile information using a machine-trained global encoder, the profile information using token information to represent a profile of the local entity as expressed by the plural content items;

after the profile information is produced by the encoding, combining, at the local computing device, token information of the original information with the token information of the profile information, to produce combined information;

producing a prompt that includes the combined information;

receiving level information that specifies an extent of transformation to be applied to the original information, the level information specifying a quantity of changes to be made to the original information by a local generative language model and/or a type of changes to be made to the original information by the local generative language model; and transforming, using the memory and processing system of the local computing device, the prompt into the customized information based on the level information using the local generative language model, the customized information being a version of the original information that expresses influence of the profile information to the extent specified by the level information, the content-providing system using a first set of parameters and consuming a first amount of resources, and the local generative language model using a second set of parameters and consuming a second amount of resources, the second set of parameters being less than the first set of parameters, and the second amount being less than the first amount.

12. The local computing device of claim 11, wherein each machine-trained local encoder is an attention-based neural network, and wherein the machine-trained global encoder is implemented by another attention-based neural network.

13. The local computing device of claim 11, wherein the content-providing system is another language model.

14. A non-transitory computer-readable storage medium for storing computer-readable instructions, a processing system executing the computer-readable instructions to perform operations, the operations comprising:

providing a query to a content-providing system from a local computing device that is associated with a local entity;

receiving, in response to the query, original information at the local computing device from the content-providing system, the content-providing system also being accessible to other local computing devices via a computing network, the other local computing devices being associated with other respective local entities;

receiving, at the local computing device, plural content items that pertain to the local entity, and encoding the plural content items to generate plural instances of local encoded information using plural machine-trained local encoders;

encoding, at the local computing device, the plural instances of local encoded information into profile information using a machine-trained global encoder, the profile information using token information to represent a profile of the local entity as expressed by the plural content items;

after the profile information is produced by the encoding, combining, at the local computing device, token information of the original information with the token information of the profile information, to produce combined information;

producing a prompt that includes the combined information;

receiving level information that specifies an extent of transformation to be applied to the original information, the level information specifying a quantity of changes to be made to the original information by a local generative language model and/or a type of changes to be made to the original information by the local generative language model; and transforming the prompt into the customized information based on the level information using the local generative language model, the customized information being a version of the original information that expresses influence of the profile information to the extent specified by the level information, the content-providing system using a first set of parameters and consuming a first amount of resources, and the local generative language model using a second set of parameters and consuming a second amount of resources, the second set of parameters being less than the first set of parameters, and the second amount being less than the first amount.

15. The computer-readable storage medium of claim 14, wherein the encoding plural content items and the encoding the plural instances of local encoded information are implemented by respective attention-based machine-trained models.

* * * * *